United States Patent
Miyazaki

(10) Patent No.: US 7,808,878 B2
(45) Date of Patent: Oct. 5, 2010

(54) OPTICAL PICKUP APPARATUS AND DRIVE APPARATUS HAVING THE SAME

(75) Inventor: Osamu Miyazaki, Mihara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 198 days.

(21) Appl. No.: 12/188,906

(22) Filed: Aug. 8, 2008

(65) Prior Publication Data

US 2009/0086609 A1 Apr. 2, 2009

(30) Foreign Application Priority Data

Sep. 27, 2007 (JP) ............... 2007-252291

(51) Int. Cl.
*G11B 7/00* (2006.01)

(52) U.S. Cl. ............. 369/112.01; 369/112.03; 369/112.23

(58) Field of Classification Search ............ 369/112.01, 369/12.02, 112.03, 112.09, 112.15, 112.23, 369/44.24, 44.41, 44.42
See application file for complete search history.

(56) References Cited

U.S. PATENT DOCUMENTS

| 5,881,035 | A | 3/1999 | Ueyama |
| 7,684,306 | B2* | 3/2010 | Matsubara et al. ..... 369/112.12 |
| 2005/0169152 | A1 | 8/2005 | Miyake et al. |
| 2006/0077550 | A1 | 4/2006 | Sano et al. |
| 2007/0189130 | A1 | 8/2007 | Anzai et al. |
| 2008/0093569 | A1 | 4/2008 | Kamisada et al. |
| 2008/0094948 | A1 | 4/2008 | Kamisada et al. |
| 2008/0094949 | A1 | 4/2008 | Kamisada et al. |
| 2008/0094951 | A1 | 4/2008 | Kamisada et al. |
| 2008/0094976 | A1 | 4/2008 | Kamisada et al. |
| 2009/0010122 | A1 | 1/2009 | Ogata et al. |
| 2009/0268584 | A1 | 10/2009 | Kamisada et al. |

FOREIGN PATENT DOCUMENTS

| JP | 8-306057 | 11/1996 |
| JP | 9-161282 A | 6/1997 |
| JP | 2005-216458 | 8/2005 |
| JP | 2006-324001 | 11/2006 |
| JP | 2008-102998 | 5/2008 |
| JP | 2008-192251 | 8/2008 |
| WO | WO-2004/068480 | 8/2004 |
| WO | WO-2006/027955 | 3/2006 |

* cited by examiner

Primary Examiner—Nabil Z Hindi
(74) Attorney, Agent, or Firm—Morrison & Foerster LLP

(57) ABSTRACT

An optical pickup apparatus and a drive apparatus having the same are provided. Second light-receiving elements or third light-receiving elements for receiving ±first-order diffraction light beams from a polarization hologram are arranged outwardly of a circular region having the optical axis of a zero-order diffraction light beam on a light detector as its center, a radius of which is expressed by $(2 \times t/n) \times (f2/f1)$, where f1 denotes a focal length of an objective lens, f2 denotes a focal length of a coupling lens, t denotes a maximum value of a light transmitting layer thickness, n denotes a refractive index of a light transmitting layer.

11 Claims, 10 Drawing Sheets

FIG. 3
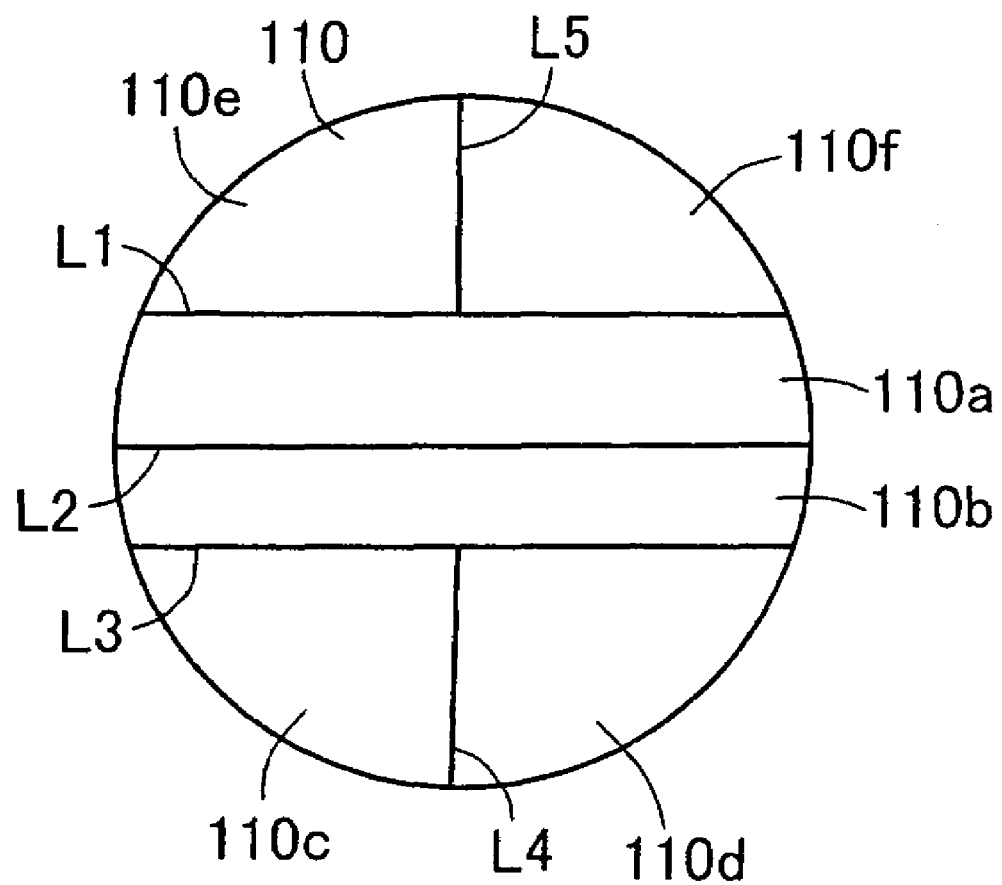
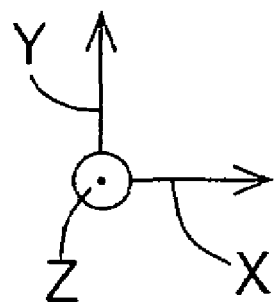

FIG. 4
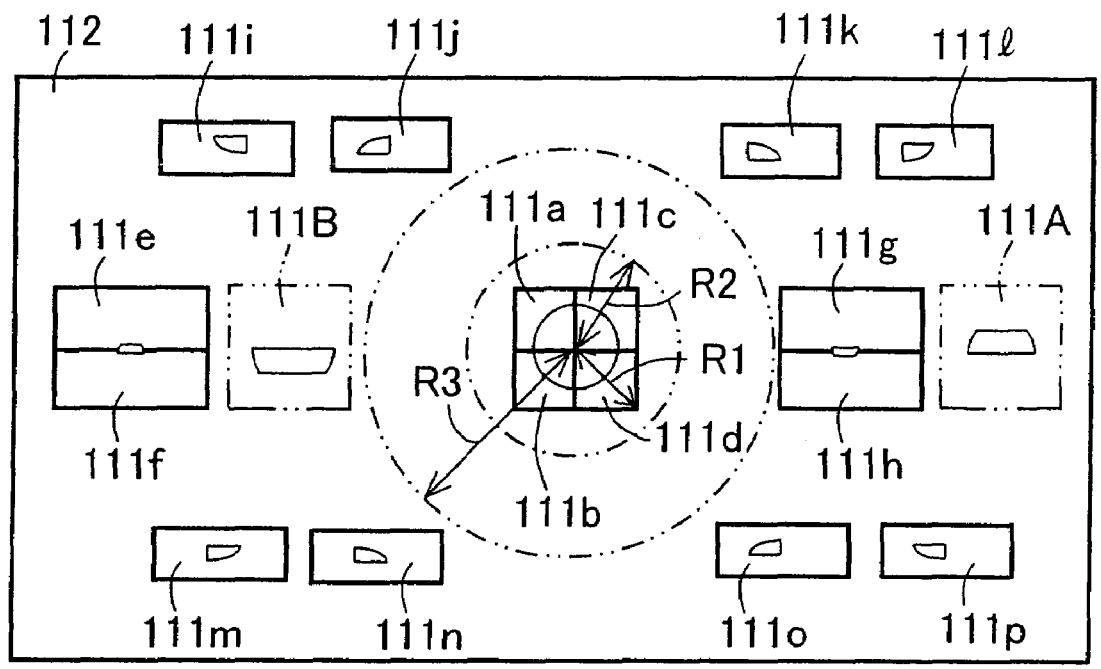
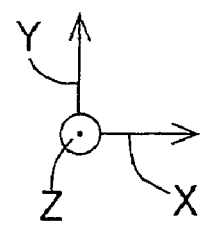

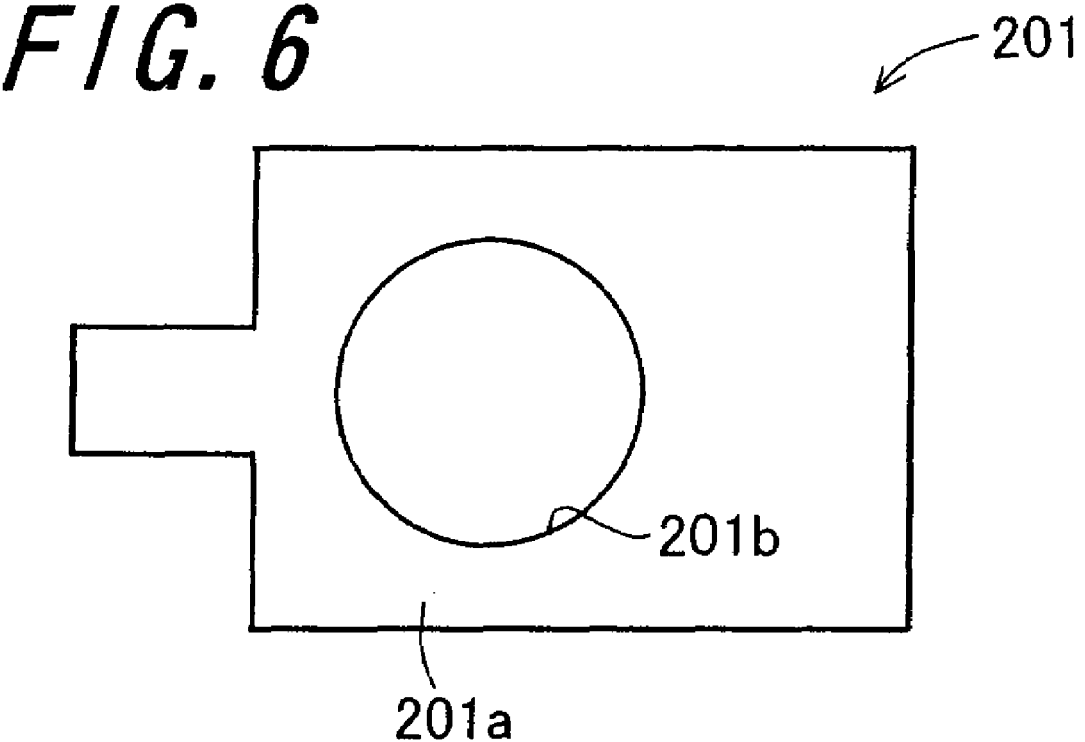
FIG. 6
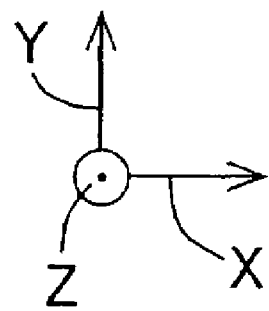

US 7,808,878 B2

OPTICAL PICKUP APPARATUS AND DRIVE APPARATUS HAVING THE SAME

CROSS-REFERENCE TO RELATED APPLICATION

This application claims priority to Japanese Patent Application No. 2007-252291, which was filed on Sep. 27, 2007, the contents of which are incorporated herein by reference in its entirety.

BACKGROUND OF THE INVENTION

1. Field of the Invention

The present invention relates to an optical pickup apparatus for performing at least one of information recording, information reproduction, and information erasing with respect to an optical recording medium such for example as a double-layered optical disc, as well as to a drive apparatus having the same.

2. Description of the Related Art

As optical recording media subjected to at least one of information recording, information reproduction, and information erasing, optical discs such as a CD (Compact Disc), a DVD (Digital Versatile Disc), and a MD (Mini Disc) have been frequently used. Such an optical recording medium has a track portion formed on its information recording layer. In order to perform at least one of information recording, information reproduction, and information erasing, it is necessary to cause a light spot convergently illuminated on the information recording layer to follow the track portion of the optical recording medium rotating at a high speed.

In order to cause the light spot to follow the track portion of the optical recording medium; that is, to exercise tracking control, a method for detecting light quantity differences among a plurality of light-receiving sections has been used, such as a push-pull method (hereafter referred to as "the PP method") and a differential push-pull method (hereafter referred to as "the DPP method").

According to the PP method, light reflected from the track portion of the optical recording medium is divided into a plurality of light beams and received by a plurality of light-receiving sections arranged symmetrically in respect to the center of the track portion. On the basis of the difference in output among the plurality of light-receiving sections, the amount of detrack is detected. The detrack amount is detected as a push-pull signal (hereafter referred to as "a PP signal") which is one of tracking error signals and serves as a signal indicative of a position relative to the track portion. When there is no output difference as described above, it is judged that a just track condition is attained.

For the purpose of achieving miniaturization, a low-profile structure, and high reliability as to an optical pickup apparatus of conventional design that adopts the PP method, there is disclosed a technique for utilizing a hologram. Hereinafter, a conventional optical pickup apparatus which adopts the PP method will be described. FIG. 9 is a configuration diagram showing the conventional optical pickup apparatus 800 in a simplified manner. FIG. 10 is an enlarged perspective view showing a part of a light integration unit provided in the conventional optical pickup apparatus 800 shown in FIG. 9.

The conventional optical pickup apparatus 800 shown in FIG. 9 includes a light integration unit including a hologram 801 and an optical system in which light emitted from the light integration unit is condensed on an optical recording medium and reflection light from the optical recording medium is directed to the light integration unit. In the optical pickup apparatus 800, outgoing light from a semiconductor laser chip 802 is diffracted by the hologram 801. Out of the diffraction light beams, a zero-order diffraction light beam passes through a coupling lens 803, a quarter (hereafter referred to as "¼") wavelength plate 804, an aperture stop 805, and an objective lens 806, and is eventually illuminated convergently on an information recording layer 808 of the optical recording medium such as a double-layered optical disc 807. Then, a return light therefrom is directed to the hologram 801 through the objective lens 806, the aperture stop 805, the ¼ wavelength plate 804, and the coupling lens 803.

Herein, an X axis, a Y axis, and a Z axis in a three-dimensional orthogonal coordinate system shown in FIG. 9 are defined as follows. The Z axis equates to an axis extending in a direction axially of the light having been emitted from the semiconductor laser chip 802 and condensed on the double-layered optical disc 807. The X axis equates to an axis located in a direction in which a line segment connecting the center of the double-layered optical disc 807 and the light condensing position extends within a virtual plane perpendicular to the Z axis. The X axis is coincident with a direction radially of the double-layered optical disc 807. Hereafter, the direction in which the X axis extends is referred to as "the radial (X) direction". The Y axis equates to an axis extending in a direction perpendicular to the X axis within the virtual plane perpendicular to the Z axis. The Y axis is coincident with the direction of the tangent to a track formed in the double-layered optical disc 807. Hereafter, the direction in which the Y axis extends is referred to as "the track (Y) direction". The definitions of those three axes are used in common throughout the present description.

As shown in FIG. 10, the hologram 801 is divided into three segmented regions: 801a, 801b, and 801c by a division line L6 extending in the radial (X) direction of the optical disc and a division line L7 extending from the center of the division line L6 in a direction corresponding to the track (Y) direction of the optical disc. A diffraction light beam derived by the segmented region 801a of the hologram 801 is condensed on a division line L8 for dividing a light-receiving element into a light-receiving element 809a and a light-receiving element 809b. A diffraction light beam derived by the segmented region 801b and a diffraction light beam derived by the segmented region 801c are condensed on a light-receiving element 809c and a light-receiving element 809d, respectively. Provided that output signals from the light-receiving elements 809a, 809b, 809c, and 809d are indicated by H1, H2, H3, and H4, respectively, then a focus error signal is obtained by computation based on a formula: (H1−H2) in accordance with a single knife-edge method. Moreover, a PP signal known as one of tracking error signals is obtained by computation based on a formula: (H3−H4) in accordance with the PP method. Further, an information signal is obtained by computation based on a formula: (H1+H2+H3+H4).

In the optical pickup apparatus employing such a hologram 801 that is disclosed in, for example, Japanese Unexamined Patent Publication JP-A 9-161282 (1997), a light-receiving element adapted for focus error signal correction is additionally provided in the structure thus far described. This makes it possible to obtain an offset-free focus error signal even in a case of using a DVD in which a distance between adjacent recording/reproduction layers is small.

However, the PP method poses the following problem. When the objective lens is shifted, the position of the return light at the light-receiving section is caused to vary, inconsequence whereof there results an offset in the tracking error signal even in the absence of detrack.

On the other hand, according to the DPP method, by a diffraction grating disposed between a light source for emitting light and an optical recording medium, the light emitted from the light source is branched into one main beam and two sub beams. The beams are illuminated on the optical recording medium. With respect to each of the main beam and the sub beams, tracking control is exercised in the manner as described previously to detect a PP signal. In this way, since tracking control is exercised by using not only the main beam but also the two sub beams, it is possible to suppress an offset which occurs in the case of adopting the PP method. However, the DPP method also poses the following problem. Since the three beams are generated from a single light emitted from the light source, the main beam to be used in information recording or information reproduction becomes smaller in light quantity relative to the light emitted from the light source. This leads to a decrease in light use efficiency. As a result, the speed of information recording or the speed of information reproduction becomes slower, which causes hindrance to the accomplishment of high-speed recording and reproduction.

In this regard, there have been proposed various methods that are based on the PP method known as a one-beam method and nevertheless allow correction of an offset which occurs in the PP method by utilizing, for example, an objective lens shift signal corresponding to the shifting of an objective lens. For example, Japanese Unexamined Patent Publication JP-A 8-306057 (1996) discloses an optical head that succeeds in reducing an offset. In this construction, a beam of reflection light from an information recording medium is received by a 6-split detector, and computation is performed on a light detection signal in each light-receiving region so as to cancel out the shifting of the reflection light beam in keeping with the shifting of an objective lens in a tracking direction. In this way, an offset occurring in a tracking error signal in accompaniment with the shifting of the objective lens can be reduced.

In recent years, as an optical recording medium, a BD (Blu-ray Disc) has been in wide use in which a light transmitting layer on which is formed an information recording layer has a thickness of 0.1 mm. In this BD, the distance between the information recording layer and the surface of the light transmitting layer (hereafter also referred to as "light transmitting layer thickness") is set to be as small as 0.075 mm to 0.100 mm. Therefore, as compared with a case of using a DVD or the like medium having a relatively large light transmitting layer thickness, the influence of stray light stemming from reflection light from the surface of the light transmitting layer is so great that there is a possibility that focus control and tracking control cannot be conducted with high accuracy.

Neither the conventional pickup apparatus disclosed in JP-A 9-161282 (1997) nor that disclosed in JP-A 8-306057 (1996) is able to solve the above-described problem caused by the use of a BD.

SUMMARY OF THE INVENTION

The invention has been devised in view of the problems such as described hereinabove, and accordingly its object is to provide an optical pickup apparatus that allows both apparatus downsizing and attainment of high light use efficiency and is, even in a case of using an optical recording medium having a light transmitting layer of small thickness, capable of exercising focus control and tracking control with high accuracy, with lesser degree of influence of stray light stemming from reflection light from a surface of the light transmitting layer of the optical recording medium, and provide a drive apparatus having the same.

The invention provides an optical pickup apparatus for performing at least one of information recording, information reproduction, and information erasing with respect to an optical recording medium having an information recording layer for recording information and a light transmitting layer, comprising:

a light source;

an objective lens for condensing a beam of light emitted from the light source on the information recording layer of the optical recording medium;

a coupling lens disposed between the light source and the objective lens;

a diffraction element disposed between the light source and the coupling lens, for diffractively branching reflection light from the optical recording medium to a zero-order diffraction light beam and ±first-order diffraction light beams;

a light detecting section including a first light-receiving element for receiving the zero-order diffraction light beam and a second light-receiving element and a third light-receiving element for receiving the ±first-order diffraction light beams;

a light branching section for directing the diffraction light beams from the diffraction element to the first light-receiving element, the second light-receiving element, and the third light-receiving element; and a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element, wherein, the third light-receiving element is disposed outwardly of a circular region having an optical axis of the zero-order diffraction light beam on the light detecting section as its center, a radius of which is expressed by $(2 \times t/n) \times (f2/f1)$, where f1 denotes a focal length of the objective lens, f2 denotes a focal length of the coupling lens, t denotes a maximum value of a thickness of the light transmitting layer, and n denotes a refractive index of the light transmitting layer.

According to the invention, the optical pickup apparatus of the invention is designed to perform at least one of information recording, information reproduction, and information erasing with respect to an optical recording medium having an information recording layer for recording information and a light transmitting layer. The optical pickup apparatus includes: a light source; an objective lens for condensing a beam of light emitted from the light source on the information recording layer of the optical recording medium; a coupling lens disposed between the light source and the objective lens; a diffraction element disposed between the light source and the coupling lens, for diffractively branching reflection light from the optical recording medium to a zero-order diffraction light beam and ±first-order diffraction light beams; a light detecting section including a first light-receiving element for receiving the zero-order diffraction light beam and a second light-receiving element and a third light-receiving element for receiving the ±first-order diffraction light beams; a light branching section for directing the diffraction light beams from the diffraction element to the first light-receiving element, the second light-receiving element, and the third light-receiving element; and a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element.

In this construction, a reproduced signal, a push-pull signal, a focus error signal, and an objective lens shift signal can be obtained from a single light detecting section including the first light-receiving element, the second light-receiving element, and the third light-receiving element. This makes it possible to achieve apparatus downsizing. Moreover, the aforementioned signals can be obtained by using the zero-order diffraction light beam and the ±first-order diffraction light beams originating from the reflection light from the optical recording medium. This makes it possible to attain high light use efficiency.

Moreover, the third light-receiving element is disposed outwardly of a circular region having the optical axis of the zero-order diffraction light beam on the light detecting section as its center, the radius of which is expressed by $(2 \times t/n) \times (f2/f1)$, where f1 denotes the focal length of the objective lens, f2 denotes the focal length of the coupling lens, t denotes the maximum value of the thickness of the light transmitting layer, and n denotes the refractive index of the light transmitting layer.

In this way, it is possible to reduce the quantity of reflection light from the light transmitting layer surface of the optical recording medium to be received by the third light-receiving element. Accordingly, even if an optical recording medium having a small light transmitting layer thickness is used, the degree of influence of stray light stemming from the reflection light from the light transmitting layer surface of the optical recording medium can be lowered. Thus, even if focus control and tracking control are performed with use of the ±first-order diffraction light beams, the control operations can be achieved with high accuracy.

Moreover, in the invention, it is preferable that the diffraction element is designed to provide diffraction efficiency such that light quantity of the zero-order diffraction light beam is eight to twelve times as much as that of respective ±first-order diffraction light beams.

According to the invention, it is possible to ensure a sufficient SN ratio for a reproduced signal, and thereby obtain a focus error signal and an objective lens shift signal with the ±first-order diffraction light beams while securing a light quantity large enough to obtain a high-quality reproduced signal.

Moreover, in the invention, it is preferable that the diffraction element is divided into a first region, a second region, and two other regions by three division lines that are in parallel with a direction radially of the optical recording medium, and the two other regions are each further divided into two regions by a division line which is in parallel with the direction of a tangent to a track formed in the optical recording medium thereby to form a third region, a fourth region, a fifth region, and a sixth region, whereupon six regions are formed, the calculating section generates a push-pull signal on the basis of an output signal from the first light-receiving element ascribed to the zero-order diffraction light beam derived by the first region, the second region, the third region, the fourth region, the fifth region, and the six region; generates an objective lens shift signal on the basis of an output signal from the third light-receiving element ascribed to the ±first-order diffraction light beams derived by the third region, the fourth region, the fifth region, and the six region; and calculates a tracking error signal on the basis of the difference between the push-pull signal and the objective lens shift signal.

According to the invention, even in the PP method known as a one-beam method, it is possible to obtain a tracking error signal which is less prone to occurrence of an offset without causing a decrease in the light quantity of the main beam, which is a problem associated with the DPP method.

Moreover, in the invention, it is preferable that the second light-receiving element is disposed outwardly of a circular region having the optical axis of the zero-order diffraction light beam on the light detecting section as its center, the radius of which is expressed by $(2 \times t/n) \times (f2/f1)$.

According to the invention, it is possible to reduce the quantity of reflection light from the light transmitting layer surface of the optical recording medium to be received by the second light-receiving element. Accordingly, even if an optical recording medium having a small light transmitting layer thickness is used, the degree of influence of stray light stemming from the reflection light from the light transmitting layer surface of the optical recording medium can be lowered even further. Thus, even if focus control and tracking control are performed with use of the ±first-order diffraction light beams, the control operations can be achieved with high accuracy.

The invention also provides an optical pickup apparatus for performing at least one of information recording, information reproduction, and information erasing with respect to an optical recording medium having an information recording layer for recording information and a light transmitting layer, comprising:

a light source;

an objective lens for condensing a beam of light emitted from the light source on the information recording layer of the optical recording medium;

a coupling lens disposed between the light source and the objective lens;

a diffraction element disposed between the light source and the coupling lens, for diffractively branching reflection light from the optical recording medium to a zero-order diffraction light beam and ±first-order diffraction light beams;

a light detecting section including a first light-receiving element for receiving the zero-order diffraction light beam and a second light-receiving element and a third light-receiving element for receiving the ±first-order diffraction light beams;

a light branching section for directing the diffraction light beams from the diffraction element to the first light-receiving element, the second light-receiving element, and the third light-receiving element; and a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element, wherein, the second light-receiving element is disposed outwardly of a circular region having an optical axis of the zero-order diffraction light beam on the light detecting section as its center, a radius of which is expressed by $(2 \times t/n) \times (f2/f1)$, where f1 denotes a focal length of the objective lens, f2 denotes a focal length of the coupling lens, t denotes a maximum value of a thickness of the light transmitting layer, and n denotes a refractive index of the light transmitting layer.

According to the invention, the optical pickup apparatus of the invention is designed to perform at least one of information recording, information reproduction, and information erasing with respect to an optical recording medium having an information recording layer for recording information and a light transmitting layer. The optical pickup apparatus includes: a light source; an objective lens for condensing a beam of light emitted from the light source on the information recording layer of the optical recording medium; a coupling lens disposed between the light source and the objective lens; a diffraction element disposed between the light source and the coupling lens, for diffractively branching reflection light from the optical recording medium to a zero-order diffraction light beam and ±first-order diffraction light beams; a light detecting section including a first light-receiving element for receiving the zero-order diffraction light beam and a second light-receiving element and a third light-receiving element for receiving the ±first-order diffraction light beams; a light branching section for directing the diffraction light beams from the diffraction element to the first light-receiving element, the second light-receiving element, and the third light-receiving element; and a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element.

In this construction, a reproduced signal, a push-pull signal, a focus error signal, and an objective lens shift signal can be obtained from a single light detecting section including the first light-receiving element, the second light-receiving element, and the third light-receiving element. This makes it possible to achieve apparatus downsizing. Moreover, the aforementioned signals can be obtained by using the zero-order diffraction light beam and the ±first-order diffraction light beams originating from the reflection light from the optical recording medium. This makes it possible to attain high light use efficiency.

Moreover, the second light-receiving element is disposed outwardly of a circular region having the optical axis of the zero-order diffraction light beam on the light detecting section as its center, the radius of which is expressed by $(2 \times t/n) \times (f2/f1)$, where f1 denotes the focal length of the objective lens, f2 denotes the focal length of the coupling lens, t denotes the maximum value of the thickness of the light transmitting layer, and n denotes the refractive index of the light transmitting layer.

In this way, it is possible to reduce the quantity of reflection light from the light transmitting layer surface of the optical recording medium to be received by the second light-receiving element. Accordingly, even if an optical recording medium having a small light transmitting layer thickness is used, the degree of influence of stray light stemming from the reflection light from the light transmitting layer surface of the optical recording medium can be lowered. Thus, even if focus control and tracking control are performed with use of the ±first-order diffraction light beams, the control operations can be achieved with high accuracy.

The invention also provides an optical pickup apparatus for performing at least one of information recording, information reproduction, and information erasing with respect to an optical recording medium having an information recording layer for recording information and a light transmitting layer, comprising:

a light source;

an objective lens for condensing a beam of light emitted from the light source on the information recording layer of the optical recording medium;

a coupling lens disposed between the light source and the objective lens;

a diffraction element disposed between the light source and the coupling lens, for diffractively branching reflection light from the optical recording medium to a zero-order diffraction light beam and ±first-order diffraction light beams;

a light detecting section including a first light-receiving element for receiving the zero-order diffraction light beam and a second light-receiving element and a third light-receiving element for receiving the ±first-order diffraction light beams;

a light branching section for directing the diffraction light beams from the diffraction element to the first light-receiving element, the second light-receiving element, and the third light-receiving element;

an aperture limiting section disposed at a location along an optical path running between the light detecting section and the coupling lens, for shielding an outer peripheral portion of reflection light from a light transmitting layer surface of the optical recording medium; and a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element, wherein the aperture limiting section has an opening, a size of which is so determined that the reflection light from the light transmitting layer surface of the optical recording medium is inhibited from entering the third light-receiving element.

According to the invention, the optical pickup apparatus of the invention is designed to perform at least one of information recording, information reproduction, and information erasing with respect to an optical recording medium having an information recording layer for recording information and a light transmitting layer. The optical pickup apparatus includes: a light source; an objective lens for condensing a beam of light emitted from the light source on the information recording layer of the optical recording medium; a coupling lens disposed between the light source and the objective lens; a diffraction element disposed between the light source and the coupling lens, for diffractively branching reflection light from the optical recording medium to a zero-order diffraction light beam and ±first-order diffraction light beams; a light detecting section including a first light-receiving element for receiving the zero-order diffraction light beam and a second light-receiving element and a third light-receiving element for receiving the ±first-order diffraction light beams; a light branching section for directing the diffraction light beams from the diffraction element to the first light-receiving element, the second light-receiving element, and the third light-receiving element; an aperture limiting section disposed at a location along the optical path running between the light detecting section and the coupling lens, for shielding the outer peripheral portion of reflection light from the light transmitting layer surface of the optical recording medium; and a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element.

In this construction, a reproduced signal, a push-pull signal, a focus error signal, and an objective lens shift signal can be obtained from a single light detecting section including the first light-receiving element, the second light-receiving element, and the third light-receiving element. This makes it possible to achieve apparatus downsizing. Moreover, the aforementioned signals can be obtained by using the zero-order diffraction light beam and the ±first-order diffraction light beams originating from the reflection light from the optical recording medium. This makes it possible to attain high light use efficiency.

Moreover, the aperture limiting section has an opening, the size of which is so determined that the reflection light from the light transmitting layer surface of the optical recording medium is inhibited from entering the third light-receiving element.

In this construction, even if the third light-receiving element cannot be disposed outwardly of the circular region having the optical axis of the zero-order diffraction light beam on the light detecting section as its center, the radius of which is expressed by $(2 \times t/n) \times (f2/f1)$, because of restrictions on the size of the light detecting section or other factor, it is possible to reduce the quantity of reflection light from the light transmitting layer surface of the optical recording medium to be received by the third light-receiving element. Accordingly, in the case of using an optical recording medium having a small light transmitting layer thickness, the degree of influence of stray light stemming from the reflection light from the light transmitting layer surface of the optical recording medium can be lowered. Thus, even if focus control and tracking control are performed with use of the ±first-order diffraction light beams, the control operations can be achieved with high accuracy.

Moreover, in the invention, it is preferable that the size of the opening is so determined that the reflection light from the light transmitting layer surface of the optical recording medium as observed on the light detecting section is larger in size than a circular region of minimum area necessary to encompass the first light-receiving element.

According to the invention, it is possible to prevent occurrence of a significant change in the quantity of the reflection light from the light transmitting layer surface on the first light-receiving element. Therefore, even if the objective lens is shifted, a push-pull signal with lesser degree of offset can be obtained.

Moreover, in the invention, it is preferable that the aperture limiting section is formed integrally with the diffraction element and is asymmetrically shaped at least in one direction with respect to the opening.

According to the invention, there is no need to make positional adjustment to the diffraction element and to the aperture limiting section on an individual basis. This leads to enhanced workability. Further, the diffraction element can be readily shifted in vertical and horizontal directions with respect to the optical pickup apparatus, and discrimination between the front side and back side of the diffraction element can be made with ease. This also leads to enhanced workability.

The invention also provides a drive apparatus having the optical pickup apparatus mentioned above.

According to the invention, by virtue of the provision of the optical pickup apparatus, the drive apparatus of the invention can be realized as a drive apparatus in which, even if an optical recording medium having a small light transmitting layer thickness is used and focus control and tracking control are exercised with use of the ±first-order diffraction light beams, the control operations can be achieved stably with high accuracy.

BRIEF DESCRIPTION OF THE DRAWINGS

Other and further objects, features, and advantages of the invention will be more explicit from the following detailed description taken with reference to the drawings wherein:

FIG. 3 is a schematic diagram showing segmented regions of a polarization hologram;

FIG. 4 is a schematic diagram showing the arrangement state of first, second, and third light-receiving elements in the light detector;

FIG. 6 is a schematic diagram showing the structure of an aperture limiting element;

DETAILED DESCRIPTION

Figure 1:
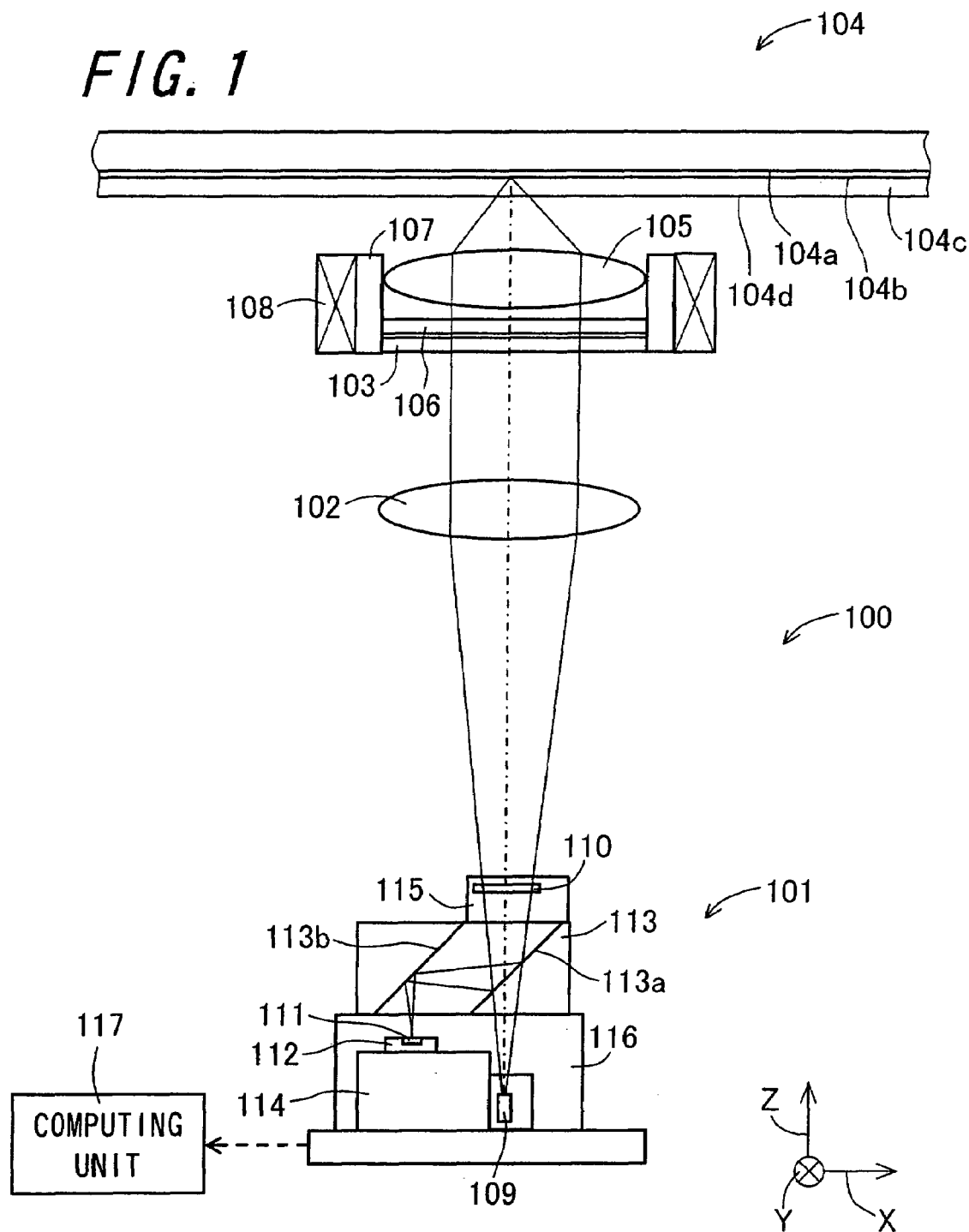
FIG. 1 is a configuration diagram showing an optical pickup apparatus according to a first embodiment of the invention in a simplified manner.

Now referring to the drawings, preferred embodiments of the invention are described below.

Whereas the invention will hereafter be described in detail by way of embodiments, it should be understood that the invention is not to be particularly restricted insofar as it does not constitute departures from the spirit and scope of the invention.

The invention concerns an optical pickup apparatus for performing at least one of information recording, information reproduction, and information erasing with respect to an optical recording medium having an information recording layer for recording information and a light transmitting layer. The optical pickup apparatus includes a light source; an objective lens for condensing a beam of light emitted from the light source on the information recording layer of the optical recording medium; a coupling lens disposed between the light source and the objective lens; a diffraction element disposed between the light source and the coupling lens, for diffractively branching reflection light from the optical recording medium to a zero-order diffraction light beam and ±first-order diffraction light beams; a light detecting section including a first light-receiving element for receiving the zero-order diffraction light beam and a second light-receiving element and a third light-receiving element for receiving the ±first-order diffraction light beams; a light branching section for directing the diffraction light beams from the diffraction element to the first light-receiving element, the second light-receiving element, and the third light-receiving element; and a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element.

In this construction, a reproduced signal, a push-pull signal, a focus error signal, and an objective lens shift signal can be obtained from a single light detecting section including the first light-receiving element, the second light-receiving element, and the third light-receiving element. This makes it possible to achieve apparatus downsizing. Moreover, the aforementioned signals can be obtained by using the zero-order diffraction light beam and the ±first-order diffraction light beams originating from the reflection light from the optical recording medium. This makes it possible to attain high light use efficiency.

Moreover, in the optical pickup apparatus according to the invention, in the case of using, for example, a BD having a light transmitting layer thickness of as small as 0.075 mm to 0.100 mm as an optical recording medium, there is a problem of an undesirable increase in the degree of influence of stray light stemming from reflection light from the light transmitting layer surface of the optical recording medium. Therefore, if the reflection light from the light transmitting layer surface of the optical recording medium enters the second or third light-receiving element for receiving the ±first-order diffraction light beams, there is a possibility that focus control, tracking control, or the like operation cannot be conducted with high accuracy.

Thus, in the optical pickup apparatus according to the invention, the placement position of the second or third light-receiving element is so determined that the reflection light from the light transmitting layer surface is inhibited from entering the second or third light-receiving element.

That is, the second or third light-receiving element is disposed outwardly of a circular region having the optical axis of the zero-order diffraction light beam on the light detecting section as its center, the radius of which is expressed by $(2 \times t/n) \times (f2/f1)$, where f1 denotes the focal length of the objective lens, f2 denotes the focal length of the coupling lens, t denotes the maximum value of the light transmitting layer thickness, and n denotes the refractive index of the light transmitting layer.

In this way, it is possible to reduce the quantity of reflection light from the light transmitting layer surface of the optical recording medium to be received by the second or third light-receiving element. Accordingly, even if an optical recording medium having a small light transmitting layer thickness is used, the degree of influence of stray light stemming from the reflection light from the light transmitting layer surface of the optical recording medium can be lowered. Thus, even if focus control and tracking control are performed with use of the ±first-order diffraction light beams, the control operations can be achieved with high accuracy.

Moreover, in a case where the third light-receiving element cannot be placed in accordance with the above-described arrangement due to, for example, restrictions imposed on the size of the light detecting section, the optical pickup apparatus construction is additionally provided with an aperture limiting section which is disposed in a location along an optical path running between the light detecting section and the coupling lens. The aperture limiting section has an opening whose size is so determined that the reflection light from the light transmitting layer surface of the optical recording medium is inhibited from entering the third light-receiving element. In this way, it is possible to reduce the quantity of the reflection light from the light transmitting layer surface of the optical recording medium to be received by the third light-receiving element. Accordingly, even if an optical recording medium having a small light transmitting layer thickness is used, the degree of influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

Hereinafter, the embodiments of the invention will be described with reference to the accompanying drawings.

First Embodiment

Figure 2:
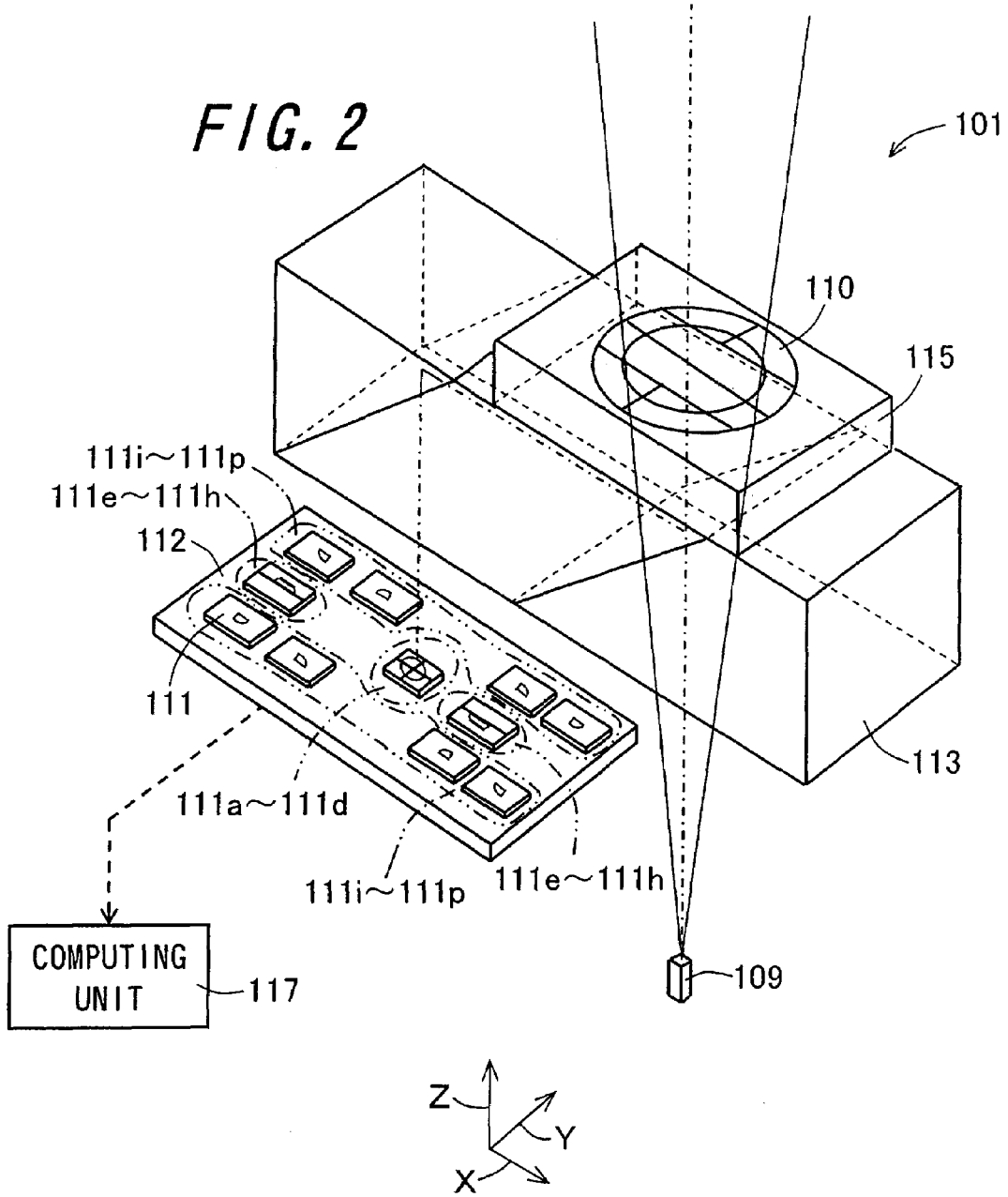
FIG. 2 is an enlarged perspective view showing a part of a light integration unit provided in the optical pickup apparatus shown in FIG. 1.

FIG. 1 is a configuration diagram showing an optical pickup apparatus 100 according to a first embodiment of the invention in a simplified manner. FIG. 2 is an enlarged perspective view showing a part of a light integration unit 101 provided in the optical pickup apparatus 100 shown in FIG. 1.

As shown in FIG. 1, the optical pickup apparatus 100 includes the light integration unit 101; a coupling lens 102 for turning light emitted from the light integration unit 101 into substantially parallel light; a ¼ wavelength plate 103 for converting the light having passed through the coupling lens 102 from a linearly-polarized light form into a circularly-polarized light form; an objective lens 105 for condensing a beam of light from the light integration unit 101 on a first information recording layer 104a (L0 layer) or a second information recording layer 104b (L1 layer) of a double-layered optical disc 104 subjected to at least one of information recording, information reproduction, and information erasing; an aperture stop 106 for adjusting a beam diameter in accordance with a specific numerical aperture of the objective lens 105; and a computing unit 117. These constituent components are surrounded by a housing (not shown) for protection.

The double-layered optical disc 104, which is applied as an optical recording medium to the optical pickup apparatus 100, includes the first and second information recording layers 104a and 104b, polycarbonate, and so forth, and also includes a light transmitting layer 104c on which are formed the first and second information recording layers 104a and 104b. Note that, in FIG. 1, a surface of the light transmitting layer 104c is designated by 104d.

In the light transmitting layer 104c, an information recording layer located away from the objective lens 105 is the first information recording layer 104a (L0 layer), whereas the one located close to the objective lens 105 is the second information recording layer 104b (L1 layer). The first and second information recording layers 104a and 104b have formed thereon minute concavities and convexities called pits in which digital signals are recorded. Depending on the presence or absence of the pits, the intensity of light reflected from the double-layered optical disc 104 is caused to vary. While the above-described construction employs the double-layered optical disc 104 as an optical recording medium, there is no particular restriction. For example, a single-layer optical disc or a multilayered disc may also be used. As the optical recording medium, for example, a CD, a DVD, and a BD may be cited. In this embodiment, a BD is employed.

In the double-layered optical disc 104 employed in this embodiment, the light transmitting layer 104c has a thickness of 0.100 mm, and the spacing between the first information recording layer 104a (L0 layer) and the second information recording layer 104b (L1 layer) is set at 0.025 mm. Accordingly, the distance (thickness) from the first information recording layer 104a (L0 layer) to the light transmitting layer surface 104d is 0.100 mm and the distance (thickness) from the second information recording layer 104b (L1 layer) to the light transmitting layer surface 104d is 0.075 mm. Moreover, the refractive index n of the light transmitting layer 104c is set at 1.59.

The coupling lens 102, the ¼ wavelength plate 103, the aperture stop 106, and the objective lens 105 are arranged in juxtaposition in the order named in a region between the light integration unit 101 and the double-layered optical disc 104. Accordingly, the coupling lens 102 is located between the light integration unit 101 and the objective lens 105.

The ¼ wavelength plate 103, the aperture stop 106, and the objective lens 105 are fixedly retained by a holder 107 so as to face the double-layered optical disc 104 located thereabove. For example, the holder 107 is constructed of a cylindrically-shaped member made of a synthetic resin material and retains the outer periphery of the ¼ wavelength plate 103, the aperture stop 106, and the objective lens 105. The holder 107 is provided with an actuator 108 for correcting positional deviation resulting from surface wobbling and decentration that the double-layered optical disc 104 undergoes, so that a light spot can be focused on the first information recording layer 104a or the second information recording layer 104b of the double-layered optical disc 104 with high accuracy. There is no particular limitation to the selection of the actuator 108 and thus those used commonly can be used. For example, it is possible to use an actuator of axial sliding type, such as moving coil type and moving magnet type, in which the holder 107 is inserted into and supported by the shaft thereof formed uprightly in a vertical direction so as to be driven in a focus direction which is a direction parallel to the shaft, as well as a circumferential direction which is an axial direction.

In order to exercise focus control and tracking control of the objective lens 105 with respect to a target track portion of the first information recording layer 104a (L0 layer) or the second information recording layer 104b (L1 layer), the ¼ wavelength plate 103, the aperture stop 106, and the objective lens 105 are integrally driven by the actuator 108.

As shown in FIGS. 1 and 2, the light integration unit 101 includes a semiconductor laser chip 109 for emitting light toward the double-layered optical disc 104; a polarization hologram 110 disposed between the semiconductor laser chip 109 and the coupling lens 102, for diffractively branching reflection light from the double-layered optical disc 104 to a zero-order diffraction light beam and ±first-order diffraction light beams; a light detector 112 including first light-receiving elements 111a to 111d for receiving the zero-order diffraction light beam and second light-receiving elements 111e to 111h and third light-receiving elements 111i to 111p for receiving the ±first-order diffraction light beams; and a light branching element 113 for directing the diffraction light beams from the polarization hologram 110 to the first light-receiving elements 111a to 111d, the second light-receiving elements 111e to 111h, and the third light-receiving elements 111i to 111p.

The semiconductor laser chip 109 is disposed on that surface of a platy stem 114 which is in parallel with a thickness-wise direction. In this embodiment, as the semiconductor laser chip 109, a BD-adaptive semiconductor laser chip that emits bluish-violet color light having an oscillation wavelength of 405 nm is used. However, there is no particular restriction and it is thus possible to use a semiconductor laser chip that emits red color light having an oscillation wavelength of 650 nm for use in information recording and reproduction with respect to a DVD, and a CD-adaptive semiconductor laser chip that emits red color light having an oscillation wavelength of 780 nm. The semiconductor laser chip 109 corresponds to the light source.

The polarization hologram 110 is disposed in a glass substrate 115 interiorly. The glass substrate 115 is disposed on the top surface of the light branching element 113. The polarization hologram 110 is an element for effecting light transmission and light diffraction in a selective manner according to the polarization direction of light. That is, by the polarization hologram 110, outgoing light, namely light in a radial (X)-directional linearly-polarized light form emitted from the semiconductor laser chip 109 toward the double-layered optical disc 104 is transmitted, and reflection light, namely light having been reflected from the double-layered optical disc 104 and converted into a track (Y)-directional linearly-polarized light form is diffractively branched. FIG. 3 is a schematic diagram showing the segmented regions of the polarization hologram 110. As shown in FIG. 3, the polarization hologram 110 is divided into a first region 110a, a second region 110b, and two other regions by three division lines L1, L2, and L3 that are in parallel with the radial (X) direction. The two other regions are each further divided into two regions by a division line L4 and a division line L5, respectively, that are in parallel with the track (Y) direction thereby to form a third region 110c, a fourth region 110d, a fifth region 110e, and a sixth region 110f. In this way, six regions are formed. In the polarization hologram 110, the reflection light from the double-layered optical disc 104 is diffractively branched to a zero-order diffraction light beam and ±first-order diffraction light beams in different directions by the six regions 110a to 110f according to the polarization direction of the light. Accordingly, 13 diffraction light beams are emanated in total.

It is preferable that the polarization hologram 110 is designed to provide diffraction efficiency such that the ratio among a −first-order diffraction light beam, a zero-order diffraction light beam, and a +first-order diffraction light beam stands at from 1:8:1 to 1:12:1. That is, it is preferable that the zero-order diffraction light beam is set to be 8 to 12 times larger in light quantity than the −first-order diffraction light beam and the +first-order diffraction light beam. By doing so, it is possible to ensure an adequate S/N ratio with respect to a reproduced signal (RF signal), and thereby obtain a focus error signal and an objective lens shift signal with the ±first-order diffraction light beams while securing a light quantity large enough to obtain a high-quality reproduced signal. The term "S/N ratio" refers to a signal power-to-noise power ratio that represents the quantity of noise contained in a signal component. The larger is the value of a S/N ratio, the better is the performance capability.

FIG. 4 is a schematic diagram showing the arrangement state of the first, second, and third light-receiving elements 111a to 111p in the light detector 112. The first, second, and third light-receiving elements 111a to 111p are arranged on the light detector 112, and the light detector 112 is disposed on the top surface of the stem 114 that is perpendicular to the thicknesswise direction. The first, second, and third light-receiving elements 111a to 111p are, for example, photoelectric conversion elements realized by the use of photodiodes. Therein, on the basis of light received, light-to-electric signal conversion is effected by means of photoelectric conversion thereby to detect signals on the pits formed on the double-layered optical disc 104. As shown in FIG. 4, the first light-receiving elements 111a to 111d are arranged in the midportion of the light detector 112. Moreover, the second light-receiving elements 111e and 111f are arranged side by side in the track (Y) direction, and so are the second light-receiving elements 111g and 111h, in such a manner that a pair of 111e and 111f and a pair of 111g and 111h have sandwiched therebetween the first light-receiving elements 111a to 111d. Further, the third light-receiving elements 111i, 111j, 111k, and 111l are arranged side by side in the radial (X) direction, and so are the third light-receiving elements 111m, 111n, 111o, and 111p, in such a manner that a group of 111i to 111l and a group of 111m to 111p have sandwiched therebetween 8 pieces of the light-receiving elements 111a to 111h. The light detector 112 corresponds to the light detecting section.

With reference to FIG. 1, in order to keep the semiconductor laser chip 109 and the first, second, and third light-receiving elements 111a to 111p from external contact, a cap 116 is attached so as to surround the stem 114. By doing so, the semiconductor laser chip 109 and the first, second, and third light-receiving elements 111a to 111p are hermetically sealed by the cap 116.

The light branching element 113 is disposed on the top surface of the cap 116. The light branching element 113 has rectangular-shaped first reflecting surface 113a and second reflecting surface 113b inclined at 45 degrees to a direction in which the Z axis extends. The light branching element 113 effects light transmission or light reflection according to the polarization direction of light thereby to branch the outgoing light from the semiconductor laser chip 109 (going light) and the reflection light from the double-layered optical disc 104 (return light). That is, the outgoing light in an radial (X)-directional linearly-polarized light form emitted from the semiconductor laser chip 109 toward the double-layered optical disc 104 is transmitted through the first reflecting surface 113a, and the light having been reflected from the double-layered optical disc 104, converted into a track (Y)-directional linearly-polarized light form by the ¼ wavelength plate 103, and diffracted by the polarization hologram 110 is reflected at a right angle from the first reflecting surface 113a. Then, the reflection light from the double-layered optical disc 104 having been reflected from the first reflecting surface 113a is further reflected at a right angle from the second reflecting surface 113b so as to be directed toward the first, second, and third light-receiving elements 111a to 111p arranged on the light detector 112. The light branching element 113 corresponds to the light branching section.

The computing unit 117 is connected to the first, second, and third light-receiving elements 111a to 111p of the light detector 112. On the basis of output signals produced by these light-receiving elements, the computing unit 117 performs computation to generate various signals such as a reproduced signal, a main push-pull signal (hereafter referred to as a "MPP signal"), a focus error signal, an objective lens shift signal, and a tracking error signal. The computing unit 117 corresponds to the calculating section.

Hereinafter, a method for generating those signals will be described in detail. The zero-order diffraction light beams derived by the first to sixth regions 110a to 110f of the polarization hologram 110 are received by the first light-receiving elements 111a to 111d. Output signals detected at the first light-receiving elements 111a, 111b, 111c, and 111d are indicated by S1, S2, S3, and S4, respectively. The output signals detected at the first light-receiving elements 111a to 111d are fed to the computing unit 117, wherein computation is performed on a differential: (S1+S2)−(S3+S4) to generate a MMP signal. Similarly, a reproduced signal (RF signal) can be obtained by performing computation on the diffraction light beams as a whole: (S1+S2+S3+S4).

The −first-order diffraction light beam derived by the first region 110a of the polarization hologram 110 is condensed on the division line for the second light-receiving elements 111e and 111f. Moreover, the +first-order diffraction light beam derived by the third region 110b of the polarization hologram 110 is condensed on the division line for the second light-receiving elements 111g and 111h. Output signals detected at the second light-receiving elements 111e, 111f, 111g, and 111h are indicated by S5, S6, S7, and S8, respectively. The output signals detected at the second light-receiving elements 111e to 111h are fed to the computing unit 117, wherein computation is performed on a differential: (S5+S8)−(S6+S7) to generate a focus error signal by a double knife edge method. According to the double knife edge method, the −first-order diffraction light beam derived by the first region 110a of the polarization hologram 110 and the +first-order diffraction light beam derived by the second region 110b thereof are adjusted to converge on their respective division lines by the convergence or diffusion action of the polarization hologram 110 in such a manner that light beams can enter uniformly the second light-receiving elements 111e and 111f, as well as the second light-receiving elements 111g and 111h, respectively. As the double-layered optical disc 104 moves away or comes near, each of the diffraction light beams becomes diffused on one of its respective light-receiving elements, namely 111e or 111f, or 111g or 111h. By exploiting this, it is possible to obtain a focus error signal. On the other hand, the +first-order diffraction light beam derived by the first region 110a of the polarization hologram 110 and the −first-order diffraction light beam derived by the second region 110b thereof are not adjusted in the above-described manner and thus cannot be converged on the division line of the light-receiving element satisfactorily. Therefore, the +first-order diffraction light beam derived by the first region 110a and the −first-order diffraction light beam derived by the second region 110b enter light-receiving element-free regions 111A and 111B, respectively, and are thus not used for focus error signal generation. In this way, by obtaining a focus error signal by calculation in accordance with the double knife edge method, even if the light detector 112 undergoes positional deviation, it is possible to prevent an offset from easily occurring in the focus error signal, and thereby perform focus control with stability.

The −first-order diffraction light beams derived by the third to sixth regions 110c, 110d, 110e, and 110f of the polarization hologram 110 are received by the third light-receiving elements 111i, 111l, 111j, and 111k, respectively. Moreover, the +first-order diffraction light beams derived by the third to sixth regions 110c, 110d, 110e, and 110f of the polarization hologram 110 are received by the third light-receiving elements 111p, 111m, 111o, and 111n, respectively. The third light-receiving elements 111k and 111n are wire-connected to each other by means of metal conductor or otherwise inside the light detector 112, so that the output detected at the third light-receiving element 111k and the output detected at the third light-receiving element 111n are added up. The eventual output is fed to the computing unit 117. This arithmetic addition of output holds true for a pair of the third light-receiving elements 111j and 111o, a pair of the third light-receiving elements 111l and 111m, and a pair of the third light-receiving elements 111i and 111p. The output signals: (111k+111n); (111j+111o); (111l+111m); and (111i+111p) obtained as the result of arithmetic addition are indicated by S9, S10, S11, and S12, respectively. The output signals detected at the four pairs of the third light-receiving elements are fed to the computing unit 117, wherein computation is performed on a differential: (S9+S11)−(S10+S12) to generate an objective lens shift signal.

Under the condition that an objective lens shift signal obtained in the absence of the shifting of the objective lens 105 is given as (s9+s11)−(s10+s12), as the objective lens 105 is shifted outward by a distance of ΔX in the radial (X) direction, the reflection light from the double-layered optical disc 104 as observed on the polarization hologram 110 is shifted outward by a distance of ΔX in the radial (X) direction correspondingly. Therefore, the diffraction light beams derived by the fourth region 110d and the sixth region 110f of the polarization hologram 110 are increased in light quantity, whereas the diffraction light beams derived by the third region 110c and the fifth region 110e are decreased in light quantity. At this time, given an increment and a decrement of light quantity in each region of Δx, then the objective lens shift signal is defined by (s9+Δx+s11+Δx)−(s10−Δx+s12−Δx)=(s9+s11)−(s10+s12)+4Δx. By way of contrast, as the objective lens is shifted inward by a distance of ΔX in the radial (X) direction, the diffraction light beams derived by the fourth region 110d and the sixth region 110f of the polarization hologram 110 are decreased in light quantity, whereas the diffraction light beams derived by the third region 110c and the fifth region 110e are increased in light quantity. As a result, the objective lens shift signal is defined by (s9−Δx+s11−Δx)−(s10+Δx+s12+Δx)=(s9+s11)−(s10+s12)−4Δx. Since the amount of Δx representing an increment and a decrement of light quantity is substantially proportional to the amount of shifting of the objective lens 105, when the objective lens 105 is shifted in the radial (X) direction, as described above, the objective lens shift signal undergoes a change in output in proportion to the amount of shifting of the objective lens 105. This makes it possible to detect a signal proportional to the amount of shifting of the objective lens 105.

Moreover, a tracking error signal is obtained by performing computation on the difference between the MPP signal and the objective lens shift signal: {(S1+S2)−(S3+S4)}−α{(S9+S11)−(S10+S12)} by means of the computing unit 117.

In the above expression, α represents a coefficient indicating the sensitivity of the objective lens shift signal. This value is dependent on the diffraction efficiency for each diffraction light beam in the polarization hologram 110 and the sensitivity of each light-receiving element of the light detector 112. The value of α should preferably fall in a range of from 2 to 3. The smaller is this value, the higher is the sensitivity of the objective lens shift signal.

In this way, by performing computation to obtain a tracking error signal with use of the push-pull signal and the objective lens shift signal thereby obtained, in the PP method known as a one-beam method, it is possible to obtain a tracking error signal which is less prone to occurrence of an offset without causing a decrease in the light quantity of the main beam, which is a problem associated with the DPP method.

In the case of performing at least one of information recording, information reproduction, and information erasing with respect to the first information recording layer 104a (L0 layer) or the second information recording layer 104b (L1 layer) of the double-layered optical disc 104, for example, in the case of performing at least one of information recording, information reproduction, and information erasing with respect to the first information recording layer 104a (L0 layer), there is a possibility that reflection light from the different information recording layer than the first information recording layer 104a, namely the second information recording layer 104b (L1 layer) inconveniently enters the light-receiving elements 111 disposed on the light detector 112. In particular, the zero-order diffraction light beam derived by the polarization hologram 110 is set to be 8 to 12 times larger in light quantity than the ±first-order diffraction light beams. Therefore, the influence of the zero-order diffraction light beam originating from the reflection light from the second information recording layer 104b is significant. In order to prevent the zero-order diffraction light beams originating from the reflection light from the second information recording layer 104b from entering the second and third light-receiving elements 111e to 111p for receiving ±first-order diffraction light beam, it is preferable that the second and third light-receiving elements 111e to 111p are placed in accordance with the following arrangement.

That is, the second and third light-receiving elements 111e to 111p are arranged outwardly of a circular region having, as its center, the optical axis of the zero-order diffraction light beam originating from the reflection light from the first information recording layer 104a as observed on the light detector 112, the radius R2 of which is expressed by (2×s/n)(f2/f1), where f1 denotes the focal length of the objective lens 105, f2 denotes the focal length of the coupling lens 102, s denotes the spacing between the first information recording layer 104a (L0 layer) and the second information recording layer 104b (L1 layer) of the double-layered optical disc 104, and n denotes the refractive index of the light transmitting layer 104c.

By virtue of such an arrangement, in the case of performing at least one of information recording, information reproduction, and information erasing with respect to the double-layered optical disc 104 including a plurality of information recording layers 104a and 104b, it is possible to prevent the entrance of the reflection light from the different information recording layer than that for performing at least one of information recording, information reproduction, and information erasing upon the second and third light-receiving elements 111e to 111p. Accordingly, focus control and tracking control can be exercised with stability. The polarization hologram 110 corresponds to the diffraction grating.

As has already been described, in the BD used as the double-layered optical disc 104 in this embodiment, the distance (thickness) from the first information recording layer 104a (L0 layer) to the light transmitting layer surface 104d is 0.100 mm and the distance (thickness) from the second information recording layer 104b (L1 layer) to the light transmitting layer surface 104d is 0.075 mm. That is, the spacing between the information recording layer 104a, 104b and the light transmitting layer surface 104d (light transmitting layer thickness) is small. Accordingly, the reflection light from the light transmitting layer surface 104d as observed on the light detector 112 has an area between approximately one-eighth and one-sixth times as great as that in a DVD having a light transmitting layer thickness of 0.6 mm.

The reflection light from the light transmitting layer surface 104d becomes stray light over against the reflection light from the first and second information recording layers 104a and 104b serving as signal light. The "stray light" refers to light that is detrimental to imaging and light convergence caused by some factor other than normal refraction and reflection. Therefore, as described just above, if the area of the reflection light from the light transmitting layer surface 104d on the light detector 112 is approximately ⅛-fold to ⅙-fold, the degree of the influence of stray light will be 36 times to 64 times greater per unit area than in the case of using a DVD.

Thus, as compared with the use of a DVD, the use of a BD poses a problem of vulnerability to the influence of the reflection light from the light transmitting layer surface 104d. In particular, in the optical pickup apparatus of this embodiment in which the polarization hologram 110 is designed to provide diffraction efficiency such that the ratio among a −first-order diffraction light beam, a zero-order diffraction light beam, and a +first-order diffraction light beam stands at from 1:8:1 to 1:12:1, since the ±first-order diffraction light beams are far smaller in light quantity than the zero-order diffraction light beam, if the reflection light from the light transmitting layer surface 104d enters the second and third light-receiving elements 111e to 111p for receiving the ±first-order diffraction light beams, the influence of stray light exerted on the signal light will become quite significant. In consequence, at the time of performing focus control and tracking control with use of the ±first-order diffraction light beams, the accuracy of the control operations could be impaired.

Thus, in order to prevent the entrance of the reflection light from the light transmitting layer surface 104d upon the third light-receiving elements 111i to 111p for receiving the ±first-order diffraction light beams, the third light-receiving elements 111i to 111p are placed in accordance with the following arrangement.

That is, the third light-receiving elements 111i to 111p are arranged outwardly of a circular region having, as its center, the optical axis of the zero-order diffraction light beam originating from the reflection light from the first information recording layer 104a or from the reflection light from the second information recording layer 104b as observed on the light detector 112, the radius R3 of which is expressed by $(2 \times t/n) \times (f2/f1)$, where f1 denotes the focal length of the objective lens 105, f2 denotes the focal length of the coupling lens 102, t denotes the maximum value of the light transmitting layer thickness, and n denotes the refractive index of the light transmitting layer 104c.

In this way, it is possible to reduce the quantity of the reflection light from the light transmitting layer surface 104d of the double-layered optical disc 104 to be received by the third light-receiving elements 111i to 111p. Accordingly, even if an optical recording medium having a small light transmitting layer thickness is used, the degree of influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

Note that the "maximum value t of the light transmitting layer thickness" refers to the spacing between the light transmitting layer surface 104d and the information recording layer which is located outermost when viewed from a light entering plane side. In this embodiment, the maximum value t refers to the spacing between the light transmitting layer surface 104d and the first information recording layer 104a (L0 layer); that is, 0.1 mm.

The reason why the maximum value t of the light transmitting layer thickness is exploited to determine the placement positions of the third light-receiving elements 111i to 111p is as follows. Considering the size of the reflection light from the light transmitting layer surface 104d as observed on the light detector 112, the reflection light size is greater in the reproduction of the information recording layer which is larger in light transmitting layer thickness, namely the first information recording layer 104a (L0 layer) in this embodiment, than in the reproduction of the information recording layer which is smaller in light transmitting layer thickness, namely the second information recording layer 104b (L1 layer) in this embodiment. Correspondingly, the influence of stray light is more significant in the former case than in the latter case. Therefore, by exploiting the maximum value t of the light transmitting layer thickness, it is possible to attain the above-described effects more reliably.

Moreover, it is preferable that the second light-receiving elements 111e to 111h are also arranged outwardly of a circular region having, as its center, the optical axis of the zero-order diffraction light beam originating from the reflection light from the first information recording layer 104a or from the reflection light from the second information recording layer 104b as observed on the light detector 112, the radius R3 of which is expressed by $(2 \times t/n) \times (f2/f1)$.

In this way, it is possible to reduce the quantity of the reflection light from the light transmitting layer surface 104d of the double-layered optical disc 104 to be received by the second light-receiving elements 111e to 111h. Accordingly, even if an optical recording medium having a small light transmitting layer thickness is used, the degree of influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

In the invention, while both of the second light-receiving elements 111e to 111h and the third light-receiving elements 111i to 111p should preferably be arranged outwardly of a circular region having a radius R3 expressed by $(2 \times t/n) \times (f2/f1)$, it is essential only that at least the third light-receiving elements 111i to 111p be placed in accordance with the above-described arrangement.

The reason therefor will be explained below. In a case where the reflection light from the light transmitting layer surface 104d enters the second light-receiving elements 111e to 111h, given the amount of output signal change attributed to the light quantity of the reflection light of Δ, then a focus error signal is indicated by $(S5+\Delta A+S8+\Delta B)-(S6+\Delta C+S7+\Delta D)$. At this time, since such relationships hold that ΔA is nearly equal to ΔC and ΔB is nearly equal to ΔD, it follows that the influence exerted by the stray light stemming from the reflection light from the light transmitting layer surface 104d is cancelled out.

On the other hand, if the reflection light from the light transmitting layer surface 104d enters the third the third light-receiving elements 111i to 111p, given the amount of output signal change attributed to the light quantity of the reflection light of Δ, then an objective lens shift signal is indicated by $(S9+\Delta E+S11+\Delta F)-(S10+\Delta G+S12+\Delta H)$. At this time, the values of ΔE and ΔF and the values of ΔG and ΔH vary in inverse relationship to each other. That is, when the values of ΔE and ΔF are positive values, then the values of ΔG and ΔH are negative values, whereas, when the values of ΔE and ΔF are negative values, then the values of ΔG and ΔH are positive values. In consequence, the influence exerted by the stray light stemming from the reflection light from the light transmitting layer surface 104d is not cancelled out. Thus, when the position of the reflection light from the light transmitting layer surface 104d is shifted on the second and third light-receiving elements 111e to 111p in accompaniment with the shifting of the objective lens, as compared with the focus error signal, the objective lens shift signal is offset-prone. Accordingly, it is preferable that at least the third light-receiving elements are arranged outwardly of a circular region having a radius R3 expressed by $(2 \times t/n) \times (f2/f1)$.

Note that, as compared with the third light-receiving elements 111i to 111p, the second light-receiving elements 111e to 111h are less susceptible to the influence exerted by the stray light stemming from the reflection light from the light transmitting layer surface 104d. However, if there is a few μm variation in the light transmitting layer thickness on the basis of a value of 100 μm, the size and intensity of the reflection light from the light transmitting layer surface 104d are caused to vary on the light-receiving elements. This leads to a possibility of occurrence of disturbance in the focus error signal. Accordingly, it is preferable that both of the second light-receiving elements 111e to 111h and the third light-receiving elements 111i to 111p are arranged outwardly of a circular region having a radius R3 expressed by (2×t/n)×(f2/f1).

Moreover, in the construction thus far described, it is essential only that, out of the second and third light-receiving elements 111e to 111p, at least the third light-receiving elements 111i to 111p be placed in accordance with the predetermined arrangement. However, the construction may be such that only the second light-receiving elements 111e to 111h are arranged outwardly of a circular region having a radius R3 expressed by (2×t/n)×(f2/f1). In this case, it is possible to reduce the quantity of the reflection light from the light transmitting layer surface 104d of the double-layered optical disc 104 to be received by the second light-receiving elements 111e to 111h. Accordingly, even if an optical recording medium having a small light transmitting layer thickness is used, the degree of the influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

Now, a description will be given below as to the workings of the optical pickup apparatus 100. The radial (X)-directional linearly-polarized light emitted from the semiconductor laser chip 109 is transmitted through the first reflecting surface 113a of the light branching element 113 and exits from the light integration unit 101. The outgoing light is turned into substantially collimated light by the coupling lens 102 and is then converted into circularly-polarized light by the ¼ wavelength plate 103. After that, the circularly-polarized light enters the objective lens 105 and is thereby illuminated convergently on the double-layered optical disc 104. The convergently-illuminated light is transmitted through the light transmitting layer 104c of the double-layered optical disc 104 and is condensed on the first information recording layer 104a (L0 layer) or the second information recording layer 104b (L1 layer). Then, the circularly-polarized light reflected from the first information recording layer 104a or the second information recording layer 104b of the double-layered optical disc 104 is transmitted through the objective lens 105 once again and is then converted into track (Y)-directional linearly-polarized light by the ¼ wavelength plate 103. After that, the track (Y)-directional linearly-polarized light is transmitted through the coupling lens 102 and enters the light integration unit 101. The light having entered the light integration unit 101 is diffractively branched to a zero-order diffraction light beam and ±first-order diffraction light beams by the first to sixth regions 110a to 110f of the polarization hologram 110, whereupon 13 diffraction light beams are emanated in total. These diffraction light beams are each reflected at a right angle from the first reflecting surface 113a and the second reflecting surface 113b of the light branching element 113 and directed to the first, second, and third light-receiving elements 111a to 111p arranged on the light detector 112. Then, by the computing unit 117, a reproduced signal, a MPP signal, a focus error signal, an objective lens shift signal, a tracking error signal, etc. are generated in a manner such as shown hereunder. On the basis of these signals, focus control and tracking control are exercised by a control section (not shown).

Second Embodiment

In the optical pickup apparatus 100 of the first embodiment, the placement positions of the third light-receiving elements 111i to 111p are so specified as to avoid the entrance of the reflection light from the light transmitting layer surface 104d upon the third light-receiving elements 111i to 111p for receiving ±first-order diffraction light beams. However, depending on restrictions to be imposed on the package size of the light detector 112, there may be a case where the third light-receiving elements 111i to 111p cannot be placed in accordance with the predetermined arrangement.

An optical pickup apparatus 200 implemented by way of a second embodiment of the invention is designed to cope with such a situation as described above. In this construction, by reducing the size of the reflection light from the light transmitting layer surface 104d as observed on the light detector 112, it is possible to lessen the influence of the reflection light from the light transmitting layer surface 104d exerted upon a focus error signal and a track error signal, and thereby achieve focus control and tracking control with high accuracy.

Hereinafter, the optical pickup apparatus 200 in accordance with the second embodiment of the invention will be described. The optical pickup apparatus 200 of the second embodiment of the invention is analogous to the first embodiment except for the provision of an aperture limiting element 201 in the light integration unit 110. In the following description, such constituent components as are identical with those in the first embodiment will be identified with the same reference symbols, and overlapping descriptions will be omitted. The aperture limiting element 201 corresponds to the aperture limiting section.

Figure 5:
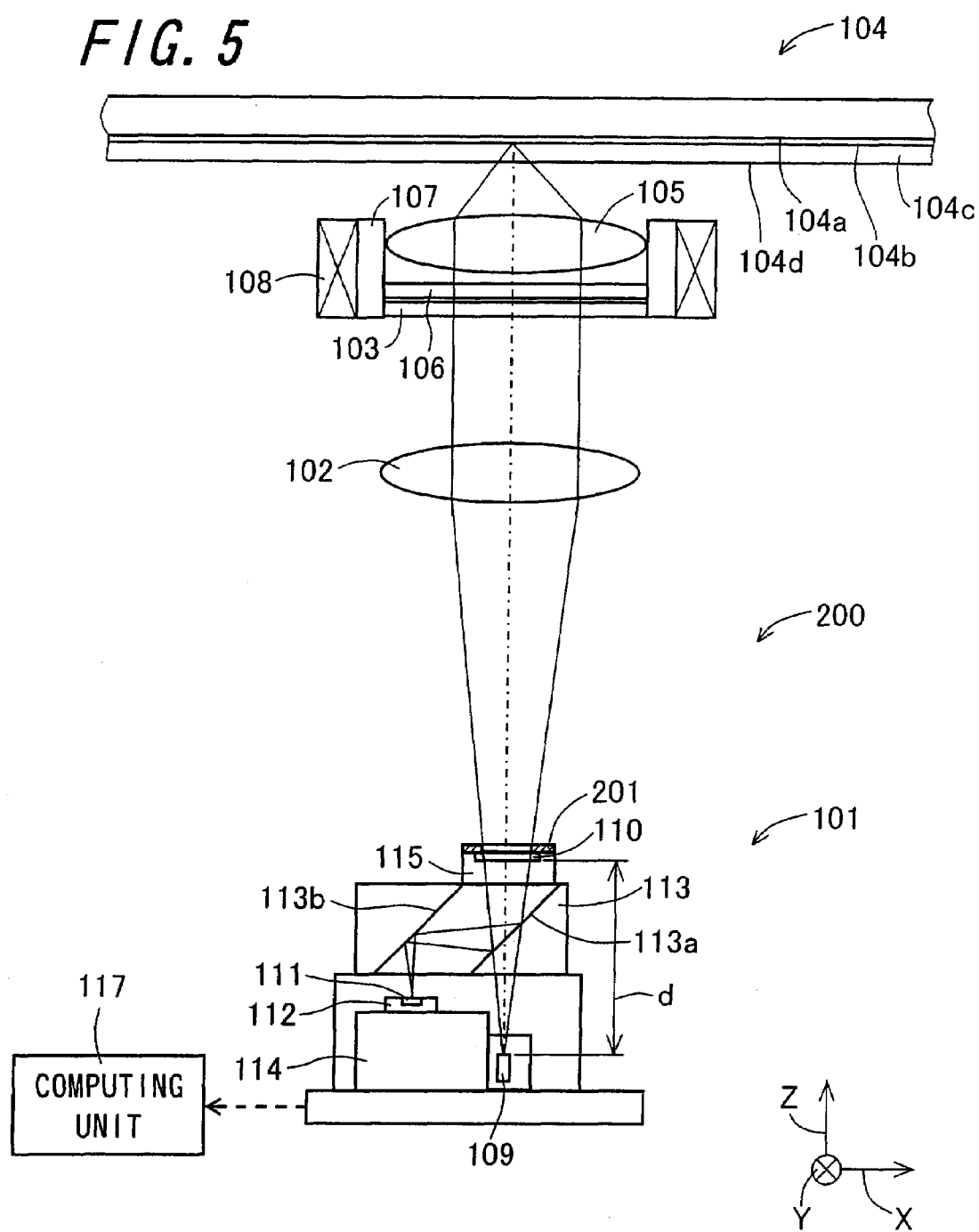
FIG. 5 is a configuration diagram showing an optical pickup apparatus according to a second embodiment of the invention in a simplified manner.

FIG. 5 is a configuration diagram showing the optical pickup apparatus 200 according to the second embodiment of the invention in a simplified manner. FIG. 6 is a schematic diagram showing the structure of the aperture limiting element 201.

In the optical pickup apparatus 200, as shown in FIG. 5, the polarization hologram 110 is disposed on the upper part of the glass substrate 115. On the top surface of the polarization hologram 110, as well as on the top surface of the glass substrate 115, is disposed the aperture limiting element 201. In this way, the polarization hologram 110 and the aperture limiting element 201 are formed integrally with each other.

The aperture limiting element 201 serves as an element for shielding the outer peripheral portion of the reflection light from the light transmitting layer surface 104d of the double-layered optical disc 104. As show in FIG. 6, the aperture limiting element 201 includes a light shielding portion 201a and a circular hole 201b. The circular hole 201b corresponds to the opening.

The reason why the outer peripheral portion of the reflection light from the light transmitting layer surface 104d is shielded is as follows. As compared with the reflection light from the first information recording layer 104a (L0 layer) and that from the second information recording layer 104b (L1 layer), the reflection light from the light transmitting layer surface 104d of the double-layered optical disc 104 is light that is reflected from a location closer to the light detector 112, and is thus not brought into convergence by the optical systems located along the path taken by the light returning from the objective lens 105 to the light detector 112. Therefore, it is impossible to use a light shielding film or the like that is capable of shielding only stray light components. Moreover, the reflection light from the light transmitting layer surface 104d is optically coaxial with the return light (reflection light) from the first information recording layer 104a (L0 layer) or the second information recording layer 104b (L1 layer) serving as signal light. Accordingly, the size of the reflection light from the light transmitting layer surface 104d can be reduced most effectively by the method of shielding the outer peripheral portion thereof.

The light shielding portion 201a is constructed of a film-like or plate-like member having a convexity on one side with respect to the circular hole 201b.

In this way, the aperture limiting element 201 is formed integrally with the polarization hologram 110 and is asymmetrically shaped at least in one direction with respect to the circular hole 201b. There is thus no need to make positional adjustment to the polarization hologram 110 and to the aperture limiting element 201 on an individual basis. This leads to enhanced workability. Moreover, the polarization hologram 110 can be readily shifted in vertical and horizontal directions with respect to the optical pickup apparatus 200, and discrimination between the front side and back side of the polarization hologram 110 can be made with ease. This also leads to enhanced workability.

There is no particular limitation to the material for constituting the light shielding portion 201a so long as it is capable of shielding the reflection light from the light transmitting layer surface 104d of the double-layered optical disc 104. For example, the light shielding portion 201a may be constructed by subjecting evaporated aluminum to black anodizing.

Moreover, in a case where a reflective film is used for the light shielding portion 201a, there is a possibility that reflection light from the reflective film is causative of stray light. Therefore, it is desirable to use a material capable of absorbing bluish-violet color light having an oscillation wavelength of 405 nm to be emitted from the semiconductor laser chip 109 serving as a light source, such for examples as black chromium.

Note that, while, in the above-described construction, the aperture limiting element 201 is so configured as to have a convexity on one side with respect to the circular hole 201b, there is no particular restriction. The aperture limiting element 201 may have another configuration so long as it is asymmetrically shaped at least in one direction with respect to the circular hole 201b. Moreover, while, in the above-described construction, the aperture limiting element 201 is formed integrally with the polarization hologram 110, there is no particular restriction. The aperture limiting element 201 does not necessarily have to be formed integrally therewith. In this case, the aperture limiting element 201 may be symmetrically shaped with respect to the circular hole 201b, for example, it may be rectangular-shaped.

The circular hole 201b is a hole having the shape of a circle, which is formed in the midportion of the aperture limiting element 201 for permitting transmission of signal light.

The size of the circular hole 201b is so determined that the reflection light from the light transmitting layer surface 104d of the double-layered optical disc 104 is inhibited from entering the third light-receiving elements 111i to 111p.

As has already been described, as compared with the second light-receiving elements 111e to 111h, the third light-receiving elements 111i to 111p are more susceptible to the influence exerted by stray light stemming from the reflection light from the light transmitting layer surface 104d. Therefore, by determining the size of the circular hole 201b in the above-described manner, it is possible to reduce the quantity of the reflection light from the light transmitting layer surface 104d of the double-layered optical disc 104 to be received by the third light-receiving elements 111i to 111p. Accordingly, even if an optical recording medium having a small light transmitting layer thickness is used, the degree of influence of stray light stemming from the reflection light from the light transmitting layer surface of the optical recording medium can be lowered. In consequence, even in the case of performing focus control and tracking control with use of the ±first-order diffraction light beams, the control operations can be achieved with high accuracy.

Moreover, as has already been described, if there is a few micrometer variation in the light transmitting layer thickness on the basis of a value of 100 µm, the size and intensity of the reflection light from the light transmitting layer surface 104d are caused to vary on the light-receiving elements. This leads to a possibility of occurrence of disturbance in the focus error signal.

Accordingly, it is more preferable that the size of the circular hole 201b is so determined that the reflection light from the light transmitting layer surface 104d of the double-layered optical disc 104 is inhibited from entering both the second light-receiving elements 111e to 111h and the third light-receiving elements 111i to 111p.

By doing so, even if an optical recording medium having a small light transmitting layer thickness is used, it is possible to lower the degree of influence of stray light stemming from the reflection light from the light transmitting layer surface of the optical recording medium even further. Accordingly, even in the case of performing focus control and tracking control with use of the ±first-order diffraction light beams, the control operations can be achieved with higher accuracy.

Note that, in the above-described construction, the size of the circular hole 201b is so determined that the reflection light from the light transmitting layer surface 104d of the double-layered optical disc 104 is inhibited from entering, out of the second and third light-receiving elements 111e to 111p, at least the third light-receiving elements 111i to 111p. Alternatively, the size of the circular hole 201b may be so determined that the reflection light is inhibited from entering only the second light-receiving elements 111e to 111h. In this case, it is possible to reduce the quantity of the reflection light from the light transmitting layer surface 104d of the double-layered optical disc 104 to be received by the second light-receiving elements 111e to 111h. Accordingly, even if an optical recording medium having a small light transmitting layer thickness is used, the degree of influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

It is also preferable that the size of the circular hole 201b is so determined that the reflection light from the light transmitting layer surface 104d of the double-layered optical disc 104 as observed on the light detector 112 is larger in size than a circular region of minimum area necessary to encompass the first light-receiving elements 111a to 111d.

In other words, it is preferable that the radius of the reflection light from the light transmitting layer surface 104d as observed on the light detector 112 is made larger than the radius R1 of the circular region of minimum area necessary to encompass the first light-receiving elements 111a to 111d.

It is impossible to avoid the entrance of the reflection light from the light transmitting layer surface 104d upon the first light-receiving elements 111a to 111d. Therefore, by determining the size of the circular hole 201b in the above-described manner, it is possible to prevent the reflection light from the light transmitting layer surface 104d from varying significantly in light quantity on the first light-receiving elements 111a to 111d. Accordingly, even if the objective lens 105 is shifted, a MPP signal with lesser degree of offset can be obtained.

Note that, while, in the above-described construction, the circular hole 201b is made to have the shape of a circle, there is no particular restriction. It is possible to adopt any given shape instead so long as the outer peripheral portion of the reflection light from the light transmitting layer surface 104d can be shielded properly. In this case, for example, an elliptical shape or a polygonal shape may be adopted.

The position at which the aperture limiting element 201 is disposed is not limited to that as suggested in the above-described construction. It is essential only that the aperture limiting element 201 be disposed at a position along the optical path running between the light detector 112 and the coupling lens 102. For example, while the aperture limiting element 201 may be disposed at a position along the optical path running between the polarization hologram 110 and the coupling lens 102 or a position along the optical path running between the polarization hologram 110 and the light branching element 113, it is preferable that the following condition is satisfied.

The difference in luminous flux diameter between the return light (reflection light) from the first information recording layer 104a (L0 layer) or the second information recording layer 104b (L1 layer) serving as signal light and the reflection light from the light transmitting layer surface 104d becomes larger gradually with increasing proximity to the light detector 112. Therefore, in order to shield the outer peripheral portion of the reflection light from the light transmitting layer 104c effectively with consideration given to the luminous flux diameter difference, it is desirable to place the aperture limiting element 201 as close to the light detector 112 as possible. However, if the aperture limiting element 201 is disposed near the light detector 112, for example, disposed between the light detector 112 and the light branching element 113, there arises a possibility that the ±first-order diffraction light beams from the polarization hologram 110 are inconveniently shielded by the light shielding portion 201a.

On the other hand, if the aperture limiting element 201 is disposed near the coupling lens 102, there arises a possibility that separation between the return light (reflection light) from the first information recording layer 104a (L0 layer) or the second information recording layer 104b (L1 layer) serving as signal light and the reflection light from the light transmitting layer surface 104d cannot be achieved satisfactorily.

In consideration of the problems thus far described, it is preferable that the aperture limiting element 201 is disposed in a location such that, given the focal length of the coupling lens 102 of f2, then a distance d from a light output window of the semiconductor laser chip 109 thereto in a direction toward the center of the coupling lens 102 falls in a range of a value of 0.25×f2 or more and a value of 0.50×f2 or less.

Figure 7:
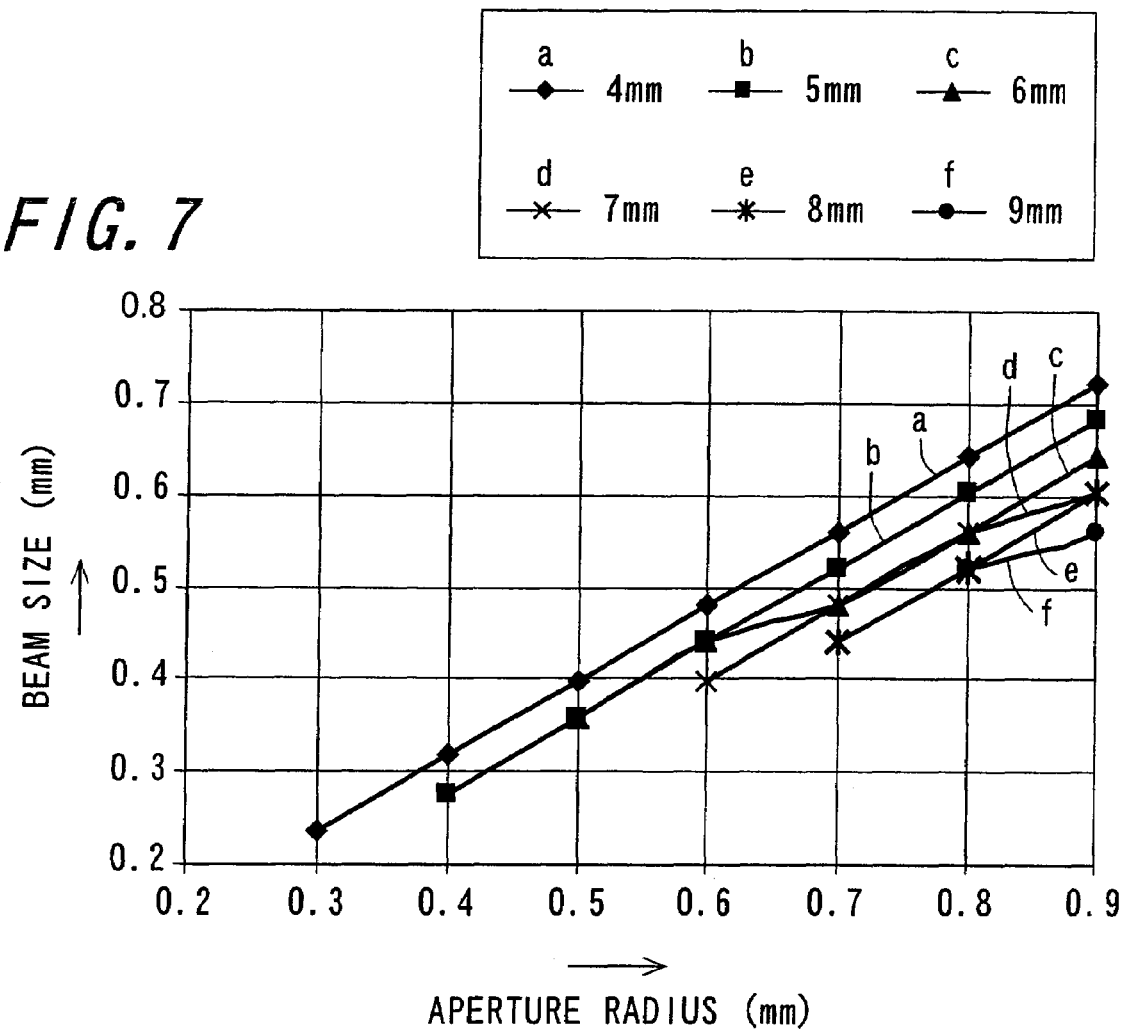
FIG. 7 is a chart showing the relationship between the dimension of an aperture radius of the aperture limiting element and a beam size as observed on the light detector, with varying distance d between a light output window of a semiconductor laser chip and the aperture limiting element.

Now, a description will be given below as to a method for determining the distance d between the light output window of the semiconductor laser chip 109 and the aperture limiting element 201 as well as the dimension of the radius of the circular hole 201b of the aperture limiting element 201 (hereafter referred to as "aperture radius"). FIG. 7 is a chart showing the relationship between the dimension of the aperture radius of the aperture limiting element 201 and a beam size as observed on the light detector 112, with varying distance d between the light output window of the semiconductor laser chip 109 and the aperture limiting element 201. At this time, the focal length f1 of the objective lens 105 is set at 1.18 mm and the focal length f2 of the coupling lens 102 is set at 15.4 mm.

In the chart shown in FIG. 7, the abscissa axis represents the dimension of the aperture radius of the aperture limiting element 201 and the ordinate axis represents the beam size as observed on the light detector 112. Moreover, six pieces of line graphs a to f plotted in FIG. 7 indicate cases with varying distance d between the light output window of the semiconductor laser chip 109 and the aperture limiting element 201. The graph a represents a case where the distance d is 4 mm; the graph b represents a case where the distance d is 5 mm; the graph c represents a case where the distance d is 6 mm; the graph d represents a case where the distance d is 7 mm; the graph e represents a case where the distance d is 8 mm; and the graph f represents a case where the distance d is 9 mm.

For example, in the case where the distance d is 5 mm, when it is desired to adjust the radius of a beam on the light detector 112 to be 0.4 mm, as indicated by the graph b, the aperture radius is set at approximately 0.55 mm.

Moreover, in the presence of varying distance d as indicated by the graphs a to f, an aperture radius of minimum value required to avoid shielding of the reflection light from the light transmitting layer surface 104d and signal light is determined for each case. Therefore, the minimum value of the beam size on the light detector 112 is increased proportionally as the distance between the aperture limiting element 201 and the coupling lens 102 is decreased; that is, as the value of the distance d is increased.

For example, in the case where the distance d is 9 mm, the assignable minimum value of the aperture radius is 0.8 mm. Therefore, as indicated by the graph f, it is impossible to adjust the beam size on the light detector 112 to be smaller than or equal to 0.52 mm. In order to reduce the beam size on the light detector 112, it is desirable to keep the distance d as small as possible.

In light of the foregoing, under the condition that the focal length f1 of the objective lens 105 is 1.18 mm and the focal length f2 of the coupling lens 102 is 15.4 mm, in order to adjust the beam size on the light detector 112 to be 0.4 mm or below, it is preferable that the distance d between the light output window of the semiconductor laser chip 109 and the aperture limiting element 201 is set to fall in a range of from 4 mm to 7 mm. Moreover, it is preferable that the dimension of the aperture radius of the aperture limiting element 201 is determined properly in the above-described manner, within the specified distance d range, so as to obtain the desired beam size.

At this time, in order to avoid the entrance of the reflection light from the light transmitting layer surface 104d of the double-layered optical disc 104 upon the third light-receiving elements 111i to 111p, the dimension of the aperture radius of the aperture limiting element 201 is so determined that the dimension of the radius of the reflection light from the light transmitting layer surface 104d as observed on the light detector 112 is smaller than the distance between the third light-receiving elements 111i to 111p and the center of the optical axis of the zero-order diffraction light beam originating from the signal light on the light detector 112.

Moreover, it is preferable that the dimension of the aperture radius of the aperture limiting element 201 is so determined that the dimension of the radius of the reflection light from the light transmitting layer surface 104d as observed on the light detector 112 is larger than the radius R1 of the circular region of minimum are a necessary to encompass the first light-receiving elements 111a to 111d.

Note that, in the construction thus far described, the setting of the distance d and the dimension of the aperture radius is conducted under the condition that the focal length f1 of the objective lens 105 is 1.18 mm and the focal length f2 of the coupling lens 102 is 15.4 mm. However, even if each of the focal length f1 and the focal length f2 takes on a different value, the distance d and the dimension of the aperture radius can be determined in a manner similar to that described hereinabove.

As described heretofore, the optical pickup apparatus 100, 200 of the invention includes the semiconductor laser chip 109; the objective lens 105 for condensing a beam of light emitted from the semiconductor laser chip 109 on the first information recording layer 104a or the second information recording layer 104b of the double-layered optical disc 104; the coupling lens 102 disposed between the semiconductor laser chip 109 and the objective lens 105; the polarization hologram 110 disposed between the semiconductor laser chip 109 and the coupling lens 102, for diffractively branching the reflection light from the double-layered optical disc 104 to a zero-order diffraction light beam and ±first-order diffraction light beams; the light detector 112 including the first light-receiving elements 111a to 111d for receiving the zero-order diffraction light beam and the second light-receiving elements 111e to 111h and the third light-receiving elements 111i to 111p for receiving the ±first-order diffraction light beams; the light branching element 113 for directing the diffraction light beams from the polarization hologram 110 to the first to third light-receiving elements 111a to 111p; and the computing unit 117 for generating a reproduced signal and a push-pull signal on the basis of output signals from the first light-receiving elements 111a to 111d, generating a focus error signal on the basis of output signals from the second light-receiving elements 111e to 111h, and generating an objective lens shift signal on the basis of output signals from the third light-receiving elements 111i to 111p.

In this construction, a reproduced signal, a push-pull signal, a focus error signal, and an objective lens shift signal can be obtained from a single light detector 112 including the first to third light-receiving elements 111a to 111p. This makes it possible to achieve apparatus downsizing. Moreover, the aforementioned signals can be obtained by using the zero-order diffraction light beam and the ±first-order diffraction light beams originating from the reflection light from the double-layered optical disc 104. This makes it possible to attain high light use efficiency.

In the optical pickup apparatus 100, the third light-receiving elements 111i to 111p are arranged outwardly of a circular region having the optical axis of the zero-order diffraction light beam on the light detector 112 as its center, the radius of which is expressed by $(2 \times t/n) \times (f2/f1)$, where f1 denotes the focal length of the objective lens 105, f2 denotes the focal length of the coupling lens 102, t denotes the maximum value of the light transmitting layer thickness, and n denotes the refractive index of the light transmitting layer 104c.

In this way, it is possible to reduce the quantity of the reflection light from the light transmitting layer surface 104d of the double-layered optical disc 104 to be received by the third light-receiving elements 111i to 111p. Accordingly, even if an optical recording medium having a small light transmitting layer thickness is used, the degree of influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

Moreover, in the optical pickup apparatus 100, the second light-receiving elements 111e to 111h may be arranged outwardly of a circular region having the optical axis of the zero-order diffraction light beam on the light detector 112 as its center, the radius of which is expressed by $(2 \times t/n) \times (f2/f1)$. In this case, it is possible to reduce the quantity of the reflection light from the light transmitting layer surface 104d of the double-layered optical disc 104 to be received by the second light-receiving elements 111e to 111h. Accordingly, even if an optical recording medium having a small light transmitting layer thickness is used, the degree of influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

Moreover, in a case where the third light-receiving elements 111i to 111p cannot be placed in accordance with the above-described arrangement due to, for example, restrictions imposed on the size of the light detector 112, the optical pickup apparatus 200 serves. The optical pickup apparatus 200 is constructed by additionally providing, in the structure of the optical pickup apparatus 100, the aperture limiting element 201 for shielding the outer peripheral portion of the reflection light from the light transmitting layer surface 104d of the double-layered optical disc 104. The aperture limiting element 201 is disposed at a position along the optical path running between the light detector 112 and the coupling lens 102. In the aperture limiting element 201 is formed the circular hole 201b, the size of which is so determined that the reflection light from the light transmitting layer surface 104d of the double-layered optical disc 104 is inhibited from entering the third light-receiving elements 111i to 111p. By doing so, it is possible to reduce the quantity of the reflection light from the light transmitting layer surface 104d of the double-layered optical disc 104 to be received by the third light-receiving elements 111i to 111p. Accordingly, even if an optical recording medium having a small light transmitting layer thickness is used, the degree of influence of stray light stemming from the reflection light from the light transmitting layer surface of the optical recording medium can be lowered. Thus, even in the case of performing focus control and tracking control with use of the ±first-order diffraction light beams, the control operations can be achieved with high accuracy.

Note that, while, in this embodiment, the semiconductor laser chip 109 and the light detector 112 are disposed in the stem 114 and are hermetically sealed by the cap 116, there is no particular restriction. For example, it is possible to use a discrete semiconductor laser chip 109 in an externally exposed state and a packaged light detector 112.

Figure 8:
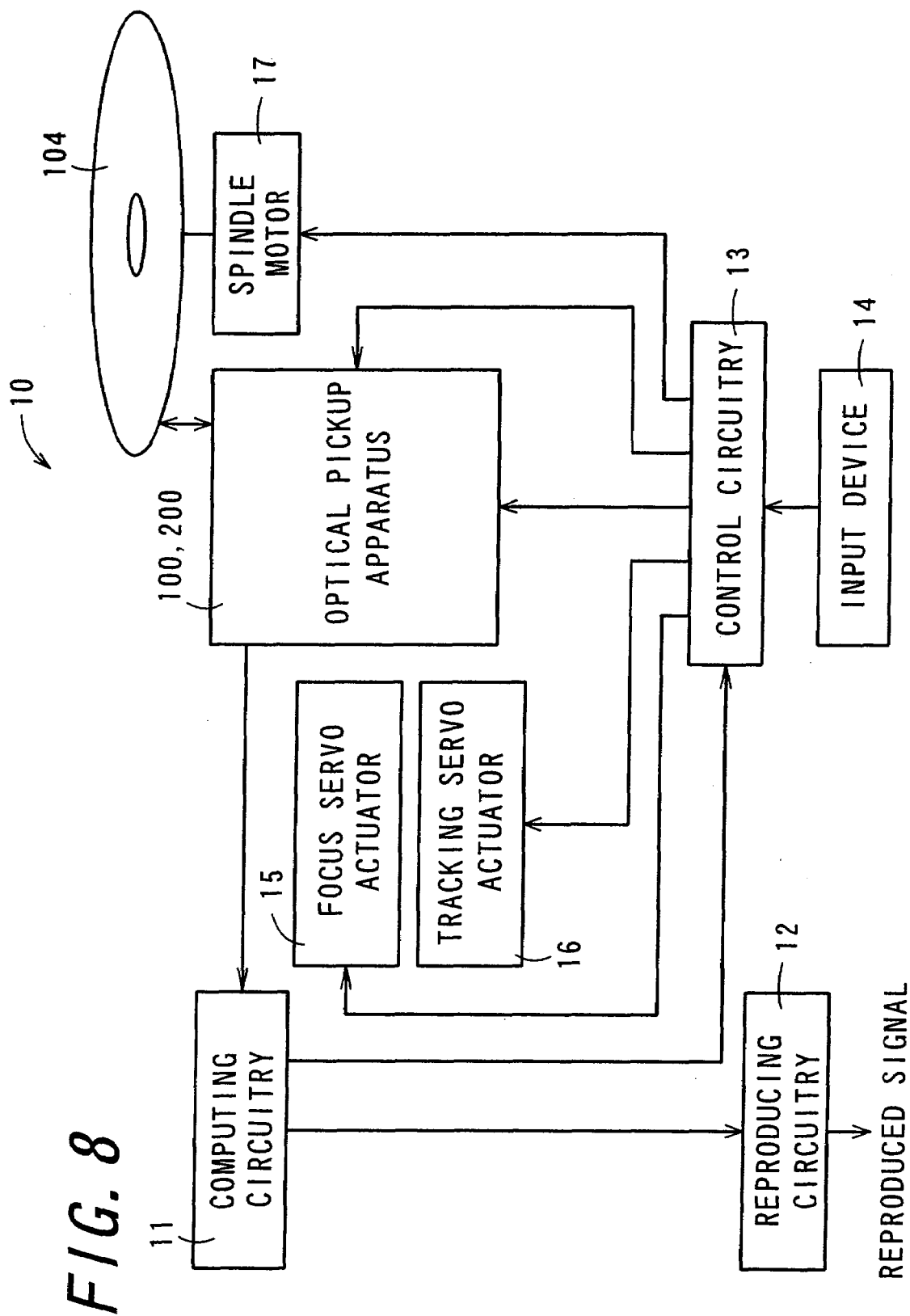
FIG. 8 is a block diagram showing the configuration of a drive apparatus acting as an information recording/reproducing apparatus.
Figure 9:
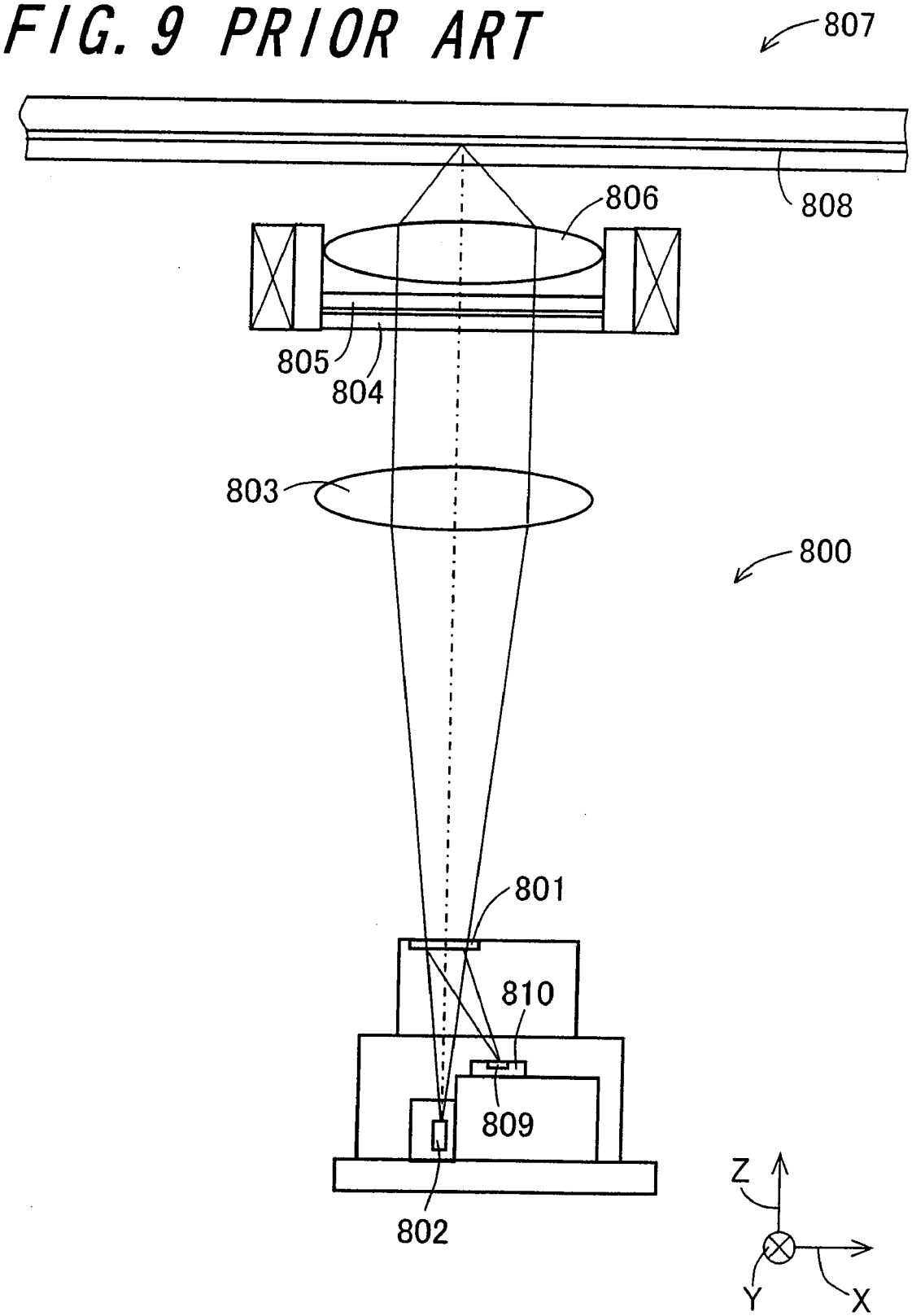
FIG. 9 is a configuration diagram showing the conventional optical pickup apparatus in a simplified manner.
Figure 10:
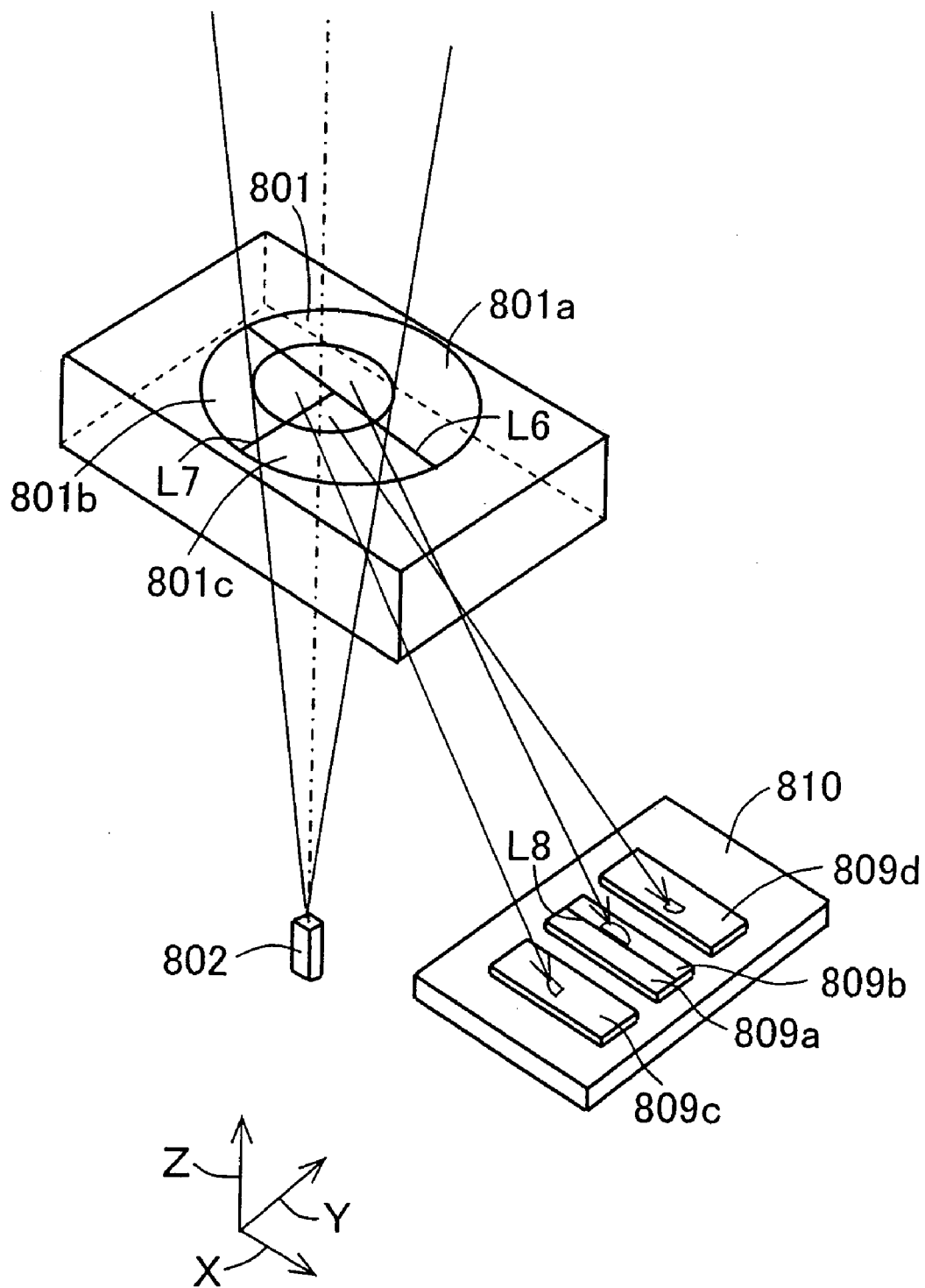
FIG. 10 is an enlarged perspective view showing a part of a light integration unit provided in the conventional optical pickup apparatus shown in FIG. 9.

FIG. 8 is a block diagram showing the configuration of a drive apparatus 10 acting as an information recording/reproducing apparatus. The drive apparatus 10 is capable of performing information recording on an optical recording medium, for example the double-layered optical disc 104 such as a BD, and is also capable of reproducing information recorded on an optical recording medium. The drive apparatus 10 includes the optical pickup apparatus 100 or 200, a computing circuitry section 11, a reproducing circuitry section 12, a control circuitry section 13, an input device 14, an actuator for focus servo 15, an actuator for tracking servo 16, and a spindle motor 17.

In the optical pickup apparatus 100 or 200, light emitted from the semiconductor laser chip 109 acting as a light source at a command issued from the control circuitry section 13 passes through the coupling lens 102, the ¼ wavelength plate 103, and the objective lens 105 so as to be condensed on the first information recording layer 104a or the second information recording layer 104b of the double-layered optical disc 104 used as an optical recording medium. Then, the light reflected from the double-layered optical disc 104 enters the light integration unit 101 wherein the light is diffractively branched to a zero-order diffraction light beam and ±first-order diffraction light beams by the polarization hologram 110. The resultant diffraction light beams are received by the first, second, and third light-receiving elements 111a to 111p of the light detector 112. On the basis of output signals from these light-receiving elements, a reproduced signal, a MPP signal, a focus error signal, an objective lens shift signal, a tracking error signal, etc. are generated. The resultant signals are outputted to the computing circuitry section 11.

In the computing circuitry section 11, on the basis of the signals fed from the optical pickup apparatus 100 or 200, a data detection signal is generated for reproducing information recorded on the double-layered optical disc 104. The resultant data detection signal is outputted to the reproducing circuitry section 12. Moreover, the computing circuitry section 11 detects both a focus error signal and a tracking error signal. The focus error signal and the tracking error signal are outputted from the computing circuitry section 11 to the control circuitry section 13.

In the reproducing circuitry section 12, the data detection signal outputted from the computing circuitry section 11 is subjected to equalization and is thereafter converted into a digital signal. Then, signal demodulation takes place through error correction or the like process. The demodulated signal is outputted, as a reproduced signal, to an external output apparatus such as a speaker.

On the basis of the focus error signal outputted from the computing circuitry section 11, the control circuitry section 13 effects control of the actuator for focus servo 15 in a manner so as to cause the objective lens 105 of the optical pickup apparatus 100 or 200 to shift in the Z axis direction, so that a beam spot of laser light can be focused therethrough onto the first information recording layer 104a or the second information recording layer 104b of the double-layered optical disc 104. In this way, focus control for adjusting the focus position of the beam spot is exercised. Moreover, on the basis of the tracking error signal outputted from the computing circuitry section 11, the control circuitry section 13 effects control of the actuator for tracking servo 16 in a manner so as to move the position of the objective lens 105 of the optical pickup apparatus 100 or 200 in the radial (X) direction, namely the direction radially of the double-layered optical disc 104, so that a beam spot of laser light can follow the track on the information recording layer of the double-layered optical disc 104. In this way, tracking control for adjusting the beam spot-to-track positional relationship is exercised.

Moreover, the control circuitry section 13 effects control of the semiconductor laser chip 109 in a manner so as to emit light at a command inputted through the input device 14, and effects control of the spindle motor 17 in a manner so as to rotate the double-layered optical disc at a predetermined speed.

As described heretofore, by virtue of the provision of the optical pickup apparatus 100 or 200 of the invention, the drive apparatus 10 of the invention can be realized as a drive apparatus in which, even if an optical recording medium having a small light transmitting layer thickness is used and focus control and tracking control are exercised with use of ±first-order diffraction light beams, the control operations can be achieved stably with high accuracy.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus for performing at least one of information recording, information reproduction, and information erasing with respect to an optical recording medium having an information recording layer for recording information and a light transmitting layer, comprising:
   a light source;
   an objective lens for condensing a beam of light emitted from the light source on the information recording layer of the optical recording medium;
   a coupling lens disposed between the light source and the objective lens;
   a diffraction element disposed between the light source and the coupling lens, for diffractively branching reflection light from the optical recording medium to a zero-order diffraction light beam and ±first-order diffraction light beams;
   a light detecting section including a first light-receiving element for receiving the zero-order diffraction light beam and a second light-receiving element and a third light-receiving element for receiving the ±first-order diffraction light beams;
   a light branching section for directing the diffraction light beams from the diffraction element to the first light-receiving element, the second light-receiving element, and the third light-receiving element; and
   a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element,
   wherein, the third light-receiving element is disposed outwardly of a circular region having an optical axis of the zero-order diffraction light beam on the light detecting section as its center, a radius of which is expressed by $(2 \times t/n) \times (f2/f1)$, where f1 denotes a focal length of the objective lens, f2 denotes a focal length of the coupling lens, t denotes a maximum value of a thickness of the light transmitting layer, and n denotes a refractive index of the light transmitting layer.

2. The optical pickup apparatus of claim 1, wherein the diffraction element is designed to provide diffraction efficiency such that light quantity of the zero-order diffraction light beam is eight to twelve times as much as that of respective ±first-order diffraction light beams.

3. The optical pickup apparatus of claim 1, wherein the diffraction element is divided into a first region, a second region, and two other regions by three division lines that are in parallel with a direction radially of the optical recording medium, and the two other regions are each further divided into two regions by a division line which is in parallel with the direction of a tangent to a track formed in the optical recording medium thereby to form a third region, a fourth region, a fifth region, and a sixth region, whereupon six regions are formed,
   the calculating section generates a push-pull signal on the basis of an output signal from the first light-receiving element ascribed to the zero-order diffraction light beam derived by the first region, the second region, the third region, the fourth region, the fifth region, and the six region; generates an objective lens shift signal on the basis of an output signal from the third light-receiving element ascribed to the ±first-order diffraction light beams derived by the third region, the fourth region, the fifth region, and the six region; and calculates a tracking error signal on the basis of the difference between the push-pull signal and the objective lens shift signal.

4. The optical pickup apparatus of claim 1, wherein the second light-receiving element is disposed outwardly of a circular region having the optical axis of the zero-order diffraction light beam on the light detecting section as its center, the radius of which is expressed by $(2 \times t/n) \times (f2/f1)$.

5. An optical pickup apparatus for performing at least one of information recording, information reproduction, and information erasing with respect to an optical recording medium having an information recording layer for recording information and a light transmitting layer, comprising:
  a light source;
  an objective lens for condensing a beam of light emitted from the light source on the information recording layer of the optical recording medium;
  a coupling lens disposed between the light source and the objective lens;
  a diffraction element disposed between the light source and the coupling lens, for diffractively branching reflection light from the optical recording medium to a zero-order diffraction light beam and ±first-order diffraction light beams;
  a light detecting section including a first light-receiving element for receiving the zero-order diffraction light beam and a second light-receiving element and a third light-receiving element for receiving the ±first-order diffraction light beams;
  a light branching section for directing the diffraction light beams from the diffraction element to the first light-receiving element, the second light-receiving element, and the third light-receiving element; and
  a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element,
  wherein, the second light-receiving element is disposed outwardly of a circular region having an optical axis of the zero-order diffraction light beam on the light detecting section as its center, a radius of which is expressed by $(2 \times t/n) \times (f2/f1)$, where f1 denotes a focal length of the objective lens, f2 denotes a focal length of the coupling lens, t denotes a maximum value of a thickness of the light transmitting layer, and n denotes a refractive index of the light transmitting layer.

6. An optical pickup apparatus for performing at least one of information recording, information reproduction, and information erasing with respect to an optical recording medium having an information recording layer for recording information and a light transmitting layer, comprising:
  a light source;
  an objective lens for condensing a beam of light emitted from the light source on the information recording layer of the optical recording medium;
  a coupling lens disposed between the light source and the objective lens;
  a diffraction element disposed between the light source and the coupling lens, for diffractively branching reflection light from the optical recording medium to a zero-order diffraction light beam and ±first-order diffraction light beams;
  a light detecting section including a first light-receiving element for receiving the zero-order diffraction light beam and a second light-receiving element and a third light-receiving element for receiving the ±first-order diffraction light beams;
  a light branching section for directing the diffraction light beams from the diffraction element to the first light-receiving element, the second light-receiving element, and the third light-receiving element;
  an aperture limiting section disposed at a location along an optical path running between the light detecting section and the coupling lens, for shielding an outer peripheral portion of reflection light from a light transmitting layer surface of the optical recording medium; and
  a calculating section for generating a reproduced signal and a push-pull signal on the basis of an output signal from the first light-receiving element, generating a focus error signal on the basis of an output signal from the second light-receiving element, and generating an objective lens shift signal on the basis of an output signal from the third light-receiving element,
  wherein the aperture limiting section has an opening, a size of which is so determined that the reflection light from the light transmitting layer surface of the optical recording medium is inhibited from entering the third light-receiving element.

7. The optical pickup apparatus of claim 6, wherein the size of the opening is so determined that the reflection light from the light transmitting layer surface of the optical recording medium as observed on the light detecting section is larger in size than a circular region of minimum area necessary to encompass the first light-receiving element.

8. The optical pickup apparatus of claim 6, wherein the aperture limiting section is formed integrally with the diffraction element and is asymmetrically shaped at least in one direction with respect to the opening.

9. A drive apparatus having the optical pickup apparatus of claim 1.

10. A drive apparatus having the optical pickup apparatus of claim 5.

11. A drive apparatus having the optical pickup apparatus of claim 6.

* * * * *